United States Patent
Griffin, II et al.

(10) Patent No.: US 10,064,458 B2
(45) Date of Patent: Sep. 4, 2018

(54) BAND WITH FOLDED SEAM FOR AN ELECTRONIC DEVICE

(71) Applicant: Apple Inc., Cupertino, CA (US)

(72) Inventors: James G. Griffin, II, Cupertino, CA (US); Benjamin A. Shaffer, Cupertino, CA (US); Edward Siahaan, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 205 days.

(21) Appl. No.: 15/258,092

(22) Filed: Sep. 7, 2016

(65) Prior Publication Data

US 2017/0065038 A1 Mar. 9, 2017

Related U.S. Application Data

(60) Provisional application No. 62/215,371, filed on Sep. 8, 2015.

(51) Int. Cl.
| | |
|---|---|
| A44C 5/00 | (2006.01) |
| A44C 5/14 | (2006.01) |
| B29C 65/00 | (2006.01) |
| A45F 5/00 | (2006.01) |

(52) U.S. Cl.
CPC .............. *A44C 5/0053* (2013.01); *A44C 5/14* (2013.01); *A45F 2005/008* (2013.01); *B29C 66/14* (2013.01)

(58) Field of Classification Search
CPC ............... A45F 2005/008; B29C 66/14; B29C 66/4324; A44C 5/0053
See application file for complete search history.

(56) References Cited

U.S. PATENT DOCUMENTS

| | | | | |
|---|---|---|---|---|
| 2,788,163 | A * | 4/1957 | Butts | A44C 5/0053 224/175 |
| 3,619,314 | A * | 11/1971 | Ecureux | B29C 65/42 156/157 |
| 3,906,130 | A | 9/1975 | Tsurumi et al. | |
| 4,031,767 | A * | 6/1977 | Guyer | B29C 66/14 198/847 |
| 4,596,540 | A * | 6/1986 | F'Geppert | F16G 3/10 24/306 |
| 4,704,112 | A | 11/1987 | Suzuki et al. | |
| 5,209,482 | A * | 5/1993 | Hopfer | A63B 21/00076 473/216 |
| 5,511,445 | A * | 4/1996 | Hildebrandt | B25G 1/01 16/421 |

(Continued)

*Primary Examiner* — Justin Larson
(74) *Attorney, Agent, or Firm* — McDermott Will & Emery LLP

(57) ABSTRACT

A wearable band formed from two or more pieces of material is disclosed. The wearable band may include a first material having a thinned portion formed on an inner surface and adjacent an end of the first material, and a second material positioned adjacent to the first material. The second material may include a thinned portion formed on an inner surface and adjacent an end of the second material. The wearable band may also include a coupling component configured to couple the first material to the second material. The thinned portion of the first material may be folded onto itself, and the thinned portion of the second material may be folded onto itself.

20 Claims, 12 Drawing Sheets

(56) References Cited

U.S. PATENT DOCUMENTS

| | | | |
|---|---|---|---|
| 5,549,193 A * | 8/1996 | Schlueter, Jr. | B29C 66/225 198/844.2 |
| 5,670,230 A * | 9/1997 | Schlueter, Jr. | F16G 3/10 198/844.2 |
| 5,688,355 A * | 11/1997 | Yu | B29C 66/723 156/257 |
| 5,698,358 A * | 12/1997 | Yu | B29C 66/12881 156/157 |
| 5,814,389 A | 9/1998 | Giacometti et al. | |
| 6,228,462 B1 | 5/2001 | Lee et al. | |
| 6,436,502 B1 * | 8/2002 | Swift | B29C 65/56 428/60 |
| 6,582,792 B1 * | 6/2003 | Godbehere | B29C 66/1222 428/57 |
| 6,638,383 B2 * | 10/2003 | Tarnawskyj | B29C 65/56 156/157 |
| 7,581,294 B2 | 9/2009 | Dilo | |
| 8,395,016 B2 | 3/2013 | Isele et al. | |
| 8,557,169 B2 | 10/2013 | Gross et al. | |
| 8,800,112 B1 * | 8/2014 | Douglas | A47J 45/10 16/421 |
| 9,579,848 B2 * | 2/2017 | Dua | A41D 27/245 |
| 9,682,512 B2 * | 6/2017 | Dua | B29C 65/72 |
| 9,848,690 B2 * | 12/2017 | Rohrbach | A45F 5/00 |
| 2009/0098385 A1 * | 4/2009 | Kaemper | B29C 66/14 428/422.8 |
| 2011/0186208 A1 * | 8/2011 | Cartabbia | B29C 66/72343 156/182 |
| 2013/0101805 A1 | 4/2013 | Altshuler et al. | |
| 2014/0255663 A1 | 9/2014 | Whitley et al. | |
| 2014/0272209 A1 | 9/2014 | Stanley et al. | |
| 2016/0311187 A1 * | 10/2016 | Shannon | B29D 30/0681 |
| 2017/0065038 A1 * | 3/2017 | Griffin, II | A44C 5/0053 |

* cited by examiner

BAND WITH FOLDED SEAM FOR AN ELECTRONIC DEVICE

CROSS-REFERENCE TO RELATED APPLICATION

This application is a nonprovisional patent application of and claims the benefit of U.S. Provisional Patent Application No. 62/215,371, filed Sep. 8, 2015 and titled "Leather Band with Seams," the disclosure of which is hereby incorporated by reference herein in its entirety.

FIELD

The disclosure relates generally to forming a band for an electronic device and, more particularly, to techniques for coupling two pieces of material together to form a folded seam for a band.

BACKGROUND

Conventional wearable electronic devices include may include a watch band for attaching the device to a user's wrist. There are varieties of materials and configurations for forming conventional wearable bands. In some cases, it may be desirable to form a band having multiple layers of different materials. However, due to normal or predictable use, a composite or multi-layer band that is constructed using some traditional techniques may be susceptible to failure. The techniques described herein may be used to form a multi-layer or multi-material band for an electronic device that may have a construction that is more robust as compared to some traditional watch bands.

SUMMARY

A wearable band is disclosed. The wearable band comprises a first material comprising a thinned portion formed on an inner surface and adjacent an end of the first material, and a second material positioned adjacent to the first material. The second material comprises a thinned portion formed on an inner surface and adjacent an end of the second material. The wearable band also comprises a coupling component configured to coupling the first material to the second material. The thinned portion of the first material is folded onto itself, and the thinned portion of the second material is folded onto itself.

A method for forming a wearable band for an electronic device is disclosed. The method comprises thinning an inner surface adjacent an end of a first material to form a first thinned portion, thinning a distinct inner surface adjacent an end of a second material to form a second thinned portion, and positioning the end of the first material adjacent the end of the second material. The first thinned portion of the first material contacts the second thinned portion of the second material. The method also comprises affixing the first thinned portion of the first material to the second thinned portion of the second material, folding the first thinned portion of the first material toward the inner surface of the first material and onto itself, and folding the second thinned portion of the second material toward the inner surface of the second material and onto itself.

A wearable electronic device is disclosed. The wearable electronic device comprises a housing, a display module positioned within the housing, and a wearable band coupled to the housing. The wearable band comprises a first material forming a top layer of the wearable band. The first material comprises a thinned portion formed on an inner surface of the first material, adjacent an end of the first material. The wearable band also comprises a second material positioned adjacent the first material and forming at least a portion of a bottom layer of the wearable band. The second material comprises a thinned portion formed on an inner surface of the second material, adjacent an end of the second material. The wearable band further comprises a coupling component formed through the thinned portion of the first material and the thinned portion of the second material to couple the first material to the second material, and a seam formed between an outer surface of the first material and an outer surface of the second material. The seam is positioned adjacent the coupling component.

Some example embodiments are directed to a wearable band having a first material with a first thinned portion formed on a first surface at a first end of the first material, and a second material having a second thinned portion formed at a second surface at a second end of the second material. The wearable band may also include a coupling component coupling the first end to the second end. The first thinned portion of the first material may be folded onto itself, and the second thinned portion of the second material may be folded onto itself. In some cases, the first thinned portion of the first material is folded about the coupling component and toward the first surface, and the second thinned portion of the second material is folded about the coupling component and toward the second surface of the second material. The coupling component may include a thread sewn through the first thinned portion and the second thinned portion.

In some embodiments, the first thinned portion of the first material has first thickness that is less than a second thickness of a remaining portion of the first material adjacent to the first thinned portion. In some cases, the first thinned portion of the first material has first thickness that is approximately half of a second thickness of a remaining portion of the first material adjacent to the first thinned portion.

Some example embodiments include a filler material positioned over the second surface and the second thinned portion of the second material. The filler material may be positioned over the first thinned portion of the first material.

Some example embodiments are directed to a method for forming a wearable band for an electronic device. A first end of a first band portion may be thinned to form a first thinned portion, and a second end of a second band portion may be thinned to form a second thinned portion. The first end of the first band portion may be positioned adjacent to the second end of the second band portion. The first thinned portion of the first band portion may be affixed to the second thinned portion of the second band portion using a coupling component. The first thinned portion of the first band portion may be folded about the coupling component and onto itself, and the second thinned portion may be folded about the coupling component and onto itself.

In some embodiments, a seam is formed between the first and second band portions. The first and second band portions near the seam may form a smooth substantially flat surface. In some cases, the first band portion and the second band portion are part of a continuous strip of material, and the first and second band portions are joined to form a loop. The loop may be flattened to form a portion of the wearable band, and the seam may be positioned along a bottom surface of the wearable band. In some cases, the loop is flattened to form the wearable band, and the seam is positioned at an attachment end of the wearable band that is configured to couple the wearable band to a device housing.

In some cases, a remaining portion of the first band portion is folded over the second band portion to form a top layer of the wearable band. The second band portion may form at least a portion of a bottom layer of the wearable band. In some embodiments, a filler material is positioned between the bottom layer and the top layer of the wearable band.

In some embodiments, the first end of the first band portion is positioned adjacent the second end of the second band portion. The positioning may include aligning the first end of the first band portion with the second end of the second band portion and releasably coupling the first band portion to the second band portion. The first thinned portion of the first band portion may be affixed to the second thinned portion of the second band portion by sewing a thread through the first thinned portion and the second thinned portion.

Some example embodiments are directed to a wearable electronic device having a housing, a display positioned within the housing, and a wearable band coupled to the housing. The wearable band may include a first material forming a top layer of the wearable band, the first material having a thinned portion formed at a first end. The wearable band may also include a second material positioned adjacent the first material and forming at least a portion of a bottom layer of the wearable band and having a second thinned portion at a second end of the second material. A coupling component may be formed through the thinned portion of the first material and the thinned portion of the second material to couple the first material to the second material. The first and second thinned portions are folded to form a seam.

In some embodiments, the first thinned portion of the first material is folded onto itself, and the first thinned portion of the first material folded onto itself has a thickness that is approximately equal to a remaining portion of the first material. In some cases, a thickness of the wearable band across the seam is substantially uniform. In some instances, the first and second thinned portions have a uniform material thickness. Alternatively, the first thinned portion of the first material may include a first tapered portion, and the second thinned portion of the second material includes a second tapered portion.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
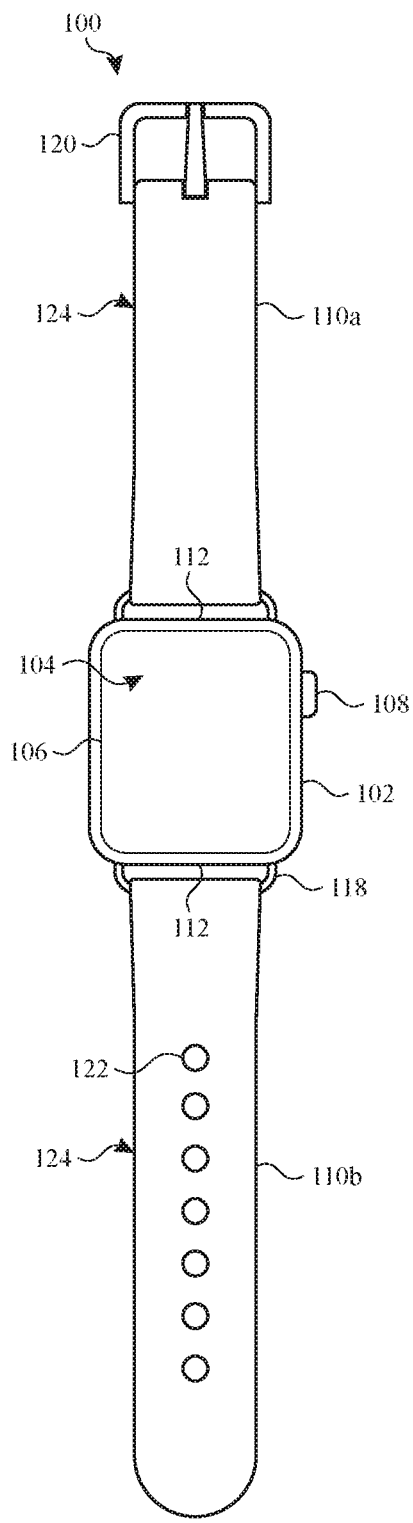
FIG. 1A shows a top view of a wearable electronic device including a wearable band, according to embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally bands for electronic devices and, more particularly, to techniques for coupling two pieces of material together to form a band for a watch or other wearable device. For a variety of reasons, it may be desirable to form a band (e.g., a watch band) out of multiple materials and/or multiple layers. For example, an outer or top layer may have a desired appearance or durability and an inner or bottom layer may have a desired softness or feel that is comfortable against the user's skin.

Some traditional techniques for joining band materials may have various drawbacks or disadvantages. For example, some leather bands are formed by using a combination of stitching and adhesive bonding. Over the operational life of the band, glue used to couple the ends of the two pieces of band material may begin to fail. Specifically, the glue coupling the ends of the band materials may dry out, be absorbed and/or may lose its adhesive properties, which may result in the uncoupling of the ends of the two pieces of material. Additionally, using some traditional techniques, the thickness of the band may not be uniform or flat, which may be undesirable.

The following embodiments may address some of the disadvantages inherent in some traditional band-forming techniques. In a particular embodiment, two or more pieces of material are used to form a wearable band for an electronic device having a uniform thickness. The pieces of material include materially thinned or skived portions that are sewn together to form a stitched portion. Once sewn together, the materially thinned portions are folded onto themselves and/or are folded about the stitched portion. By folding the thinned portions onto themselves, the piece of material maintains a uniform thickness in both the materially thinned portion and the unaltered, remaining portions. The uniform thickness allows for the material to be substantially flat when formed into a wearable band, strap, tether, lanyard, strip or the like. Additionally, by sewing the two pieces of material together at the thinned portions, a seam is formed between the two pieces of material that is strong and substantially permanent. Furthermore, a wearable band formed from two pieces of material as discussed herein includes improved comfort, fit and/or wearability, as the seam and/or transition between the two pieces of material is smooth and/or has no identifiable bulge or discontinuity. The seam formed between the two pieces of material is also aesthetically pleasing to the user because the thickness between the two materials is uniform on either side of the seam, and the thread used to sew the material together and form the seam is hidden from view. Finally, the pieces of material forming the wearable band can be formed from two different types and/or colors of material, which allows the wearable band to have distinct patterns or a two-tone appearance.

These and other embodiments are discussed below with reference to FIGS. 1A-8D. However, those skilled in the art will readily appreciate that the detailed description given herein with respect to these Figures is for explanatory purposes only and should not be construed as limiting.

Figure 1B:
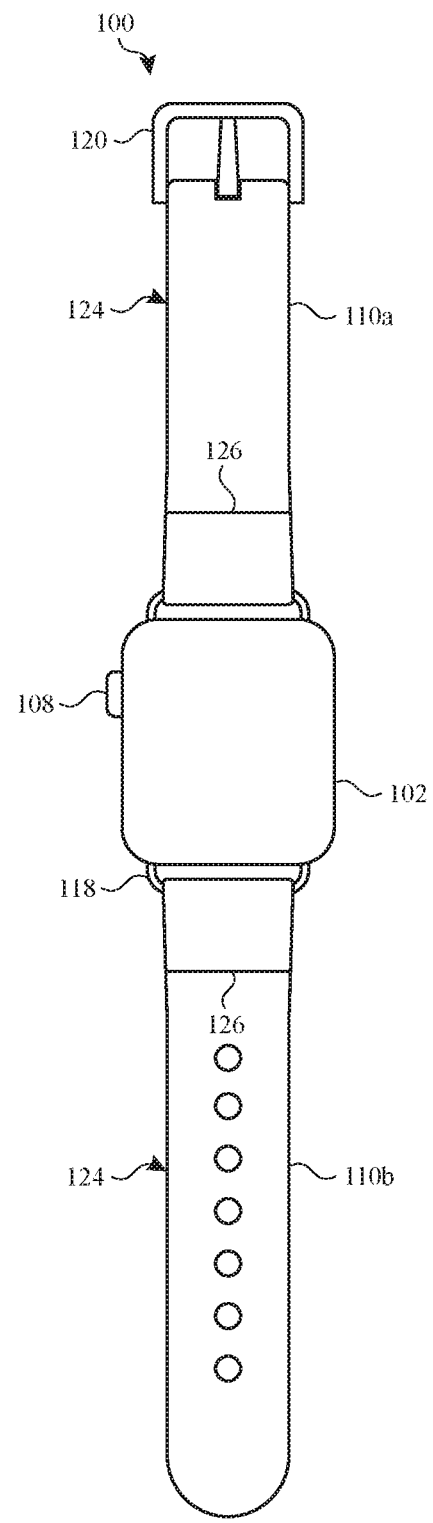
FIG. 1B shows a bottom view of the wearable electronic device including the wearable band shown in FIG. 1A, according to embodiments.

FIGS. 1A and 1B show top and bottom views, respectively, of a portable or wearable electronic device 100 (hereafter, "electronic device"), according to embodiments. Electronic device 100, as shown in FIGS. 1A and 1B, is configured as a wearable device such as an electronic or smart watch. However, it is understood that electronic device 100 can be configured as a mobile telephone, a gaming device, a display, a digital music player, a wearable computing device or display, a health monitoring device, and so on.

As discussed herein, electronic device 100 includes a wearable band (e.g., wristband, armband, headband, necklace, etc.) for holding or attaching to an electronic device including, but not limited to a wearable electronic device or other type of portable electronic device. As discussed herein, each wearable band 110*a*, 110*b* is formed from at least two distinct pieces of material that have a uniform thickness. That is, the two pieces of material forming each wearable band 110*a*, 110*b* have uniform thicknesses in and around a seam formed where the materials are coupled together. The techniques described herein may be used to form a seam between two materials or portions of a band that results in a smooth substantially flat surface and/or a uniform thickness. The smooth substantially flat surface and uniform thickness may provide wearable bands 110*a*, 110*b* with an aesthetically pleasing appearance and comfortable feel.

In some instances, the seam is formed when the materials are sewn together. By sewing the materials together, the bond and/or coupling between the first material and the second material is substantially strong and/or permanent. Forming a strong bond and/or coupling the two materials forming the wearable band by sewing them together improves the operational life of the wearable band and/or prevents the wearable band from failing, which can result in the wearable band being unable to keep the electronic device on a user's wrist. As described in more detail below, the materials can be thinned or skived and folded to provide a seam that is flat and has a substantially uniform thickness.

In some embodiments, the bands 110*a*, 110*b* are formed from two different materials that are joined using the techniques described herein. In some embodiments, the bands 110*a*, 110*b* are formed from a single strip or section of material. A first and second portions or ends of the strip of material may be similarly joined using the techniques described herein. While example embodiments may be provided with respect to a particular configuration (two materials or a single strip), the techniques described herein may be applied to a variety of configurations and the examples are not intended to be limiting.

In some implementations, two materials (e.g., two types of leather, a leather and a synthetic, two types of synthetic) may be joined or coupled to form the wearable bands 110*a*, 110*b*. Each material may have different structural properties, tactile feel, and/or appearance. In some cases, the materials are selected to provide a band having composite properties: a first set of properties (associated with a first material) for an inner layer that comes in contact with a user's skin, and a second set of properties (associated with a second material) for an outer layer that is visible and exposed to various environmental elements.

In some implementations, one or multiple materials may be formed into a continuous strip of material that is used to form the wearable bands 110a, 110b. The continuous strip of material may define a first and second portions at a respective first and second ends of the strip. The first and second ends may be jointed to each other using the techniques described herein to form a loop or other closed shape. In some cases, the loop may be flattened to form the wearable bands 110a, 110b.

Electronic device 100 includes a housing 102 at least partially surrounding a display 104, and a cover 106 coupled to housing 102 and covering display 104 to protect display 104 of electronic device 100 from contaminants. The electronic device 100 also includes one or more input devices or buttons 108 configured to provide user input and/or allow the user to interact with the various functions of electronic device 100. The housing 102 forms an outer surface, partial outer surface, and/or protective case for the internal components of electronic device 100, and at least partially surrounds the display 104. Housing 102 may be formed from a plurality of distinct materials including, but not limited to, metal, glass, and plastic.

As shown in FIGS. 1A and 1B, electronic device 100 also includes wearable bands 110a, 110b positioned on opposite sides of housing 102. Housing 102 includes recesses 112 formed on opposite ends for receiving an attachment component 118 to couple wearable bands 110a, 110b to electronic device 100. Specifically, and as shown in FIGS. 1A and 1B, wearable bands 110a, 110b are coupled to attachment component 118, and a portion of attachment component 118 is coupled and/or positioned within recesses 112 of housing 102 to couple the wearable bands 110a, 110b to housing 102 of electronic device 100. Although shown as two distinct bands 110a, 110b forming a wearable band for electronic device 100, it is understood that the wearable band can be formed from a single band embodiment that is formed from two or more pieces of material as discussed herein.

Wearable bands 110a, 110b secure electronic device 100 to a user, or any other object capable of receiving electronic device 100. In a non-limiting example shown in FIGS. 1A and 1B, wearable bands 110a, 110b include buckle 120, and sizing apertures 122 (hereafter, "apertures") formed on second wearable band 110b positioned opposite buckle 120. Although shown as buckle 120 and apertures 122, it is understood the wearable bands 110a, 110b can include any suitable coupling and/or securing structure or component for securing electronic device 100 to a user or other object capable of receiving electronic device 100.

Additionally as shown in FIG. 1B, and as discussed below in detail, two (or more) pieces of material are used to form each wearable band 110a, 110b. The two pieces of material wearable forming each of wearable bands 110a, 110b can be coupled along perimeter 124 and are sewn together to form seam 126. Specifically, free ends of each of the two pieces of material forming each of wearable bands 110a, 110b are sewn together to form seam 126 within wearable bands 110a, 110b. Seam 126 can be formed on the bottom side or layer of wearable bands 110a, 110b of electronic device 100 as shown in FIG. 1B. As a result, seam 126 contacts a user's wrist when electronic device 100 is worn by a user and/or is not visible when a user is wearing electronic device 100. Although shown as being formed on a bottom layer of wearable bands 110a. 110b, it is understood and discussed herein that seam 126 can be formed in any portion of wearable bands 110a, 110b. Additionally as discussed herein, although wearable bands 110a, 110b may be formed from two distinct pieces of material, the thickness of the materials and/or the overall thickness of wearable bands 110a, 110b is substantially uniform, even at seam 126 and the portions of wearable bands 110a, 110b surrounding seam 126. Although discussed herein as being formed from two pieces of material, it is understood that wearable bands 110a, 110b can be formed from more than two pieces of material.

As discussed herein, each wearable band 110a, 110b can be formed from two or more distinct portions, sections, layers and/or pieces of material. The distinct pieces of material forming wearable bands 110a, 110b can be distinct or similar in material composition, color and/or thickness, as discussed herein. In non-limiting examples, the pieces of material forming wearable bands 110a, 110b are formed from natural or synthetic materials, such as leather, woven material such as textiles, non-woven material, such as, felt, synthetic materials, such as polymers or synthetic rubber, or any other suitable material that is substantially flexible and capable of being thinned, as discussed herein. Additionally, although two pieces are shown and discussed herein for forming wearable bands 110a, 110b, it is understood that any number of pieces of material can be used to form wearable bands 110a, 110b, and each of the pieces of material can be distinct or similar in material composition, color and/or thickness. Where wearable bands 110a, 110b are formed from more than two pieces of material, it is understood that multiple seams 126 are formed within wearable bands 110a, 110b in a similar fashion as discussed herein.

Figure 2:
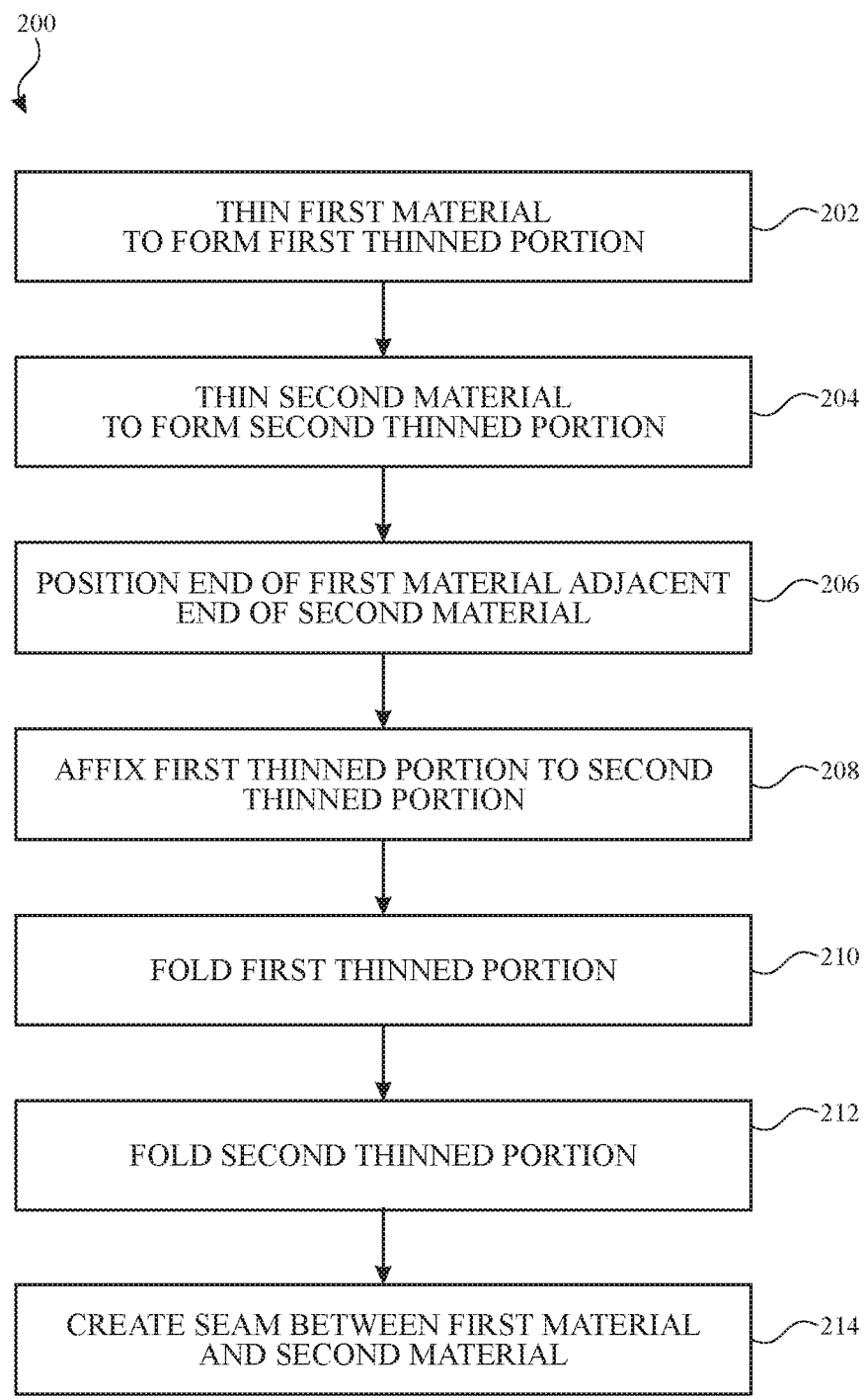
FIG. 2 shows a flow chart of an example process for forming a wearable band for an electronic device, according to embodiments.

FIG. 2 depicts an example process for forming a wearable band for an electronic device. Specifically, FIG. 2 is a flowchart depicting one example process 200 for forming a wearable band from two distinct pieces of material. While this is provided as one example, the process 200 may also be used to form a seam between a first and second band portion of a continuous strip of material or a variety of other configurations. With regard to the following description of process 200, two materials and/or two band portions may be joined together to form a flat seam. In some cases, the wearable band may be utilized in an electronic device, as discussed above with respect to FIGS. 1A and 1B.

In operation 202, a first material or a first portion is thinned to form a first thinned portion. In one example, an inner surface of the first material is materially thinned at an end of the first material to form the first thinned portion in the first material. Thinning the first material to form the first thinned portion includes removing a thickness of material from the end of the first material. That is, thinning the first material includes removing a thickness of material and/or substantially thinning the material thickness of a portion of the first material. In non-limiting examples, the first thinned portion of the first material can be formed by performing a skiving process or a material splitting process on the first material. As such, the first thinned portion includes a portion of the first material that has a reduced thickness. The material thinned and/or removed from the first material is removed from the inner surface of the first material such that an outer surface of the first material remains unchanged. In a non-limiting example, the thickness of the removed material is equal to a thickness of the remaining material of the first material forming the first thinned portion. In another non-limiting example, the thickness of the removed material is less than or greater than the material thickness of the first thinned portion. Additionally in non-limiting examples, the first material is thinned to form the first thinned portion to have a uniform thickness or, alternatively, a tapered thickness that is smallest at the end of the first material.

Operation 204 is substantially similar to operation 202, and is performed on a second material or a second portion that is distinct from the first material or first portion. In one example, a second material is thinned to form a second thinned portion. Specifically, an inner surface of the second material is materially thinned at an end of the second material to form the second thinned portion in the second material. The thinning of the inner surface of the second material to form the second materially thinned portion includes removing a thickness of material from the end of the second material. As such, the second thinned portion includes a portion of the second material that has a reduced thickness. In a non-limiting example, the thickness of the removed material is equal to a thickness of the remaining material of the second material forming the second thinned portion. In another non-limiting example, the thickness of the removed material is less than or greater than the material thickness of the second thinned portion. Additionally, in further non-limiting examples, the material thickness of the second thinned portion is equal to or different than the material thickness of the first thinned portion formed in operation 202. In additional non-limiting examples, the remaining material of the second material forming the second thinned portion is thinned to have a uniform thickness or, alternatively, a tapered thickness that is smallest at the end of the second material.

In operation 206, the end of the first material (or first portion) is positioned adjacent the end of the second material (or second portion). In one example, the ends of the first material and the second material are positioned adjacent one another, such that the first thinned portion of the first material contacts the second thinned portion of the second material. Additionally, positioning the end of the first material adjacent the end of the second material also includes contacting at least a portion of the outer surface of the first material adjacent to at least a portion of the outer surface of the second material. The portion of the outer surface of the first material includes a portion of the outer surface positioned adjacent the end of the first material and adjacent the first thinned portion of the first material. Additionally, the portion of the outer surface of the second material includes a portion of the outer surface positioned adjacent the end of the second material and adjacent the second thinned portion of the second material. When the portions of the outer surfaces of the first material and second material contact one another, the inner surface of the first material is positioned opposite the inner surface of the second material.

Additionally, positioning the end of the first material adjacent the end of the second material includes aligning the end of the first material with the end of the second material and releasably and/or temporarily coupling the first material to the second material. The aligned ends of the first material and the second material are aligned in a common plane. The releasable and/or temporary coupling of the first material to the second material also includes using a temporary coupler to couple the end of the first material to the end of the second material. The temporary coupler can include a variety of suitable components or devices that releasably and/or temporarily couple the end of the first material to the end of the second material. In non-limiting examples, the temporary coupler can include, but is not limited to, tape wrapped around the ends of the first material and the second material, a clamp or pin contacting and/or clamping the ends of the first material and the second material, a temporary stitch formed through the ends of the first material and the second material, or temporary adhesive formed adjacent the ends on and/or between contacting outer surfaces of the first material and the second material.

In operation 208, the first thinned portion of the first material (or first portion) is affixed to the second thinned portion of the second material (or second portion). As a result of affixing the first thinned portion of the first material to the second thinned portion of the second material, the first material is coupled to the second material. Affixing the first thinned portion of the first material to the second thinned portion of the second material can include sewing the first thinned portion of the first material affixed to the second thinned portion of the second material. The first thinned portion is sewn to the second thinned portion using a thread. The thread is sewn through the first thinned portion of the first material and the second thinned portion of the second material, adjacent or proximate to the respective ends for the first material and the second material. The thread is formed from any suitable material capable of coupling the first material to the second material and can be sewn through the first thinned portion and the second thinned portion using any suitable sewing technique or process.

In operation 210, the first thinned portion is folded toward the inner surface of the first material (or first portion). For example, the end of the first material including the first thinned portion may be folded toward the inner surface, and the first thinned portion is folded onto and/or over itself. The first thinned portion is folded at or about the thread sewn through the first thinned portion. The folding of the first thinned portion can also include securing the first thinned portion to itself. The first thinned portion can be secured using any suitable coupling or fixing component, feature and/or technique. In a non-limiting example, the first thinned portion can be secured using an adhesive.

In operation 212, the second thinned portion is folded toward the inner surface of the second material (or second portion) and folded onto and/or over itself. The second thinned portion is folded at or about the thread sewn through the second thinned portion. Similar to the folding of the first thinned portion in operation 210, the folding of the second thinned portion can also include securing the second thinned portion to itself. The second thinned portion can be secured to itself using any suitable coupling or fixing component, feature and/or technique. In a non-limiting example, the second thinned portion can be secured using an adhesive.

In operation 214, a seam is created between the first material and the second material. The seam is created specifically between the outer surface of the first material and the outer surface of the second material. The seam created in operation 214 is also positioned adjacent the thread sewn through the first material and the second material. As a result of creating the seam between the outer surface of the first material and the outer surface of the second material, the seam is substantially visible.

Creating the seam in operation 214 can include positioning the seam on a bottom layer of the wearable band formed using the process 200 discussed herein. The wearable band is formed after creating the seam in operation 214 and performing additional final processes on the first material and the second material, as discussed below. In a non-limiting example, positioning the seam on the bottom layer of the wearable band includes folding the remaining portion of the first material over the first thinned portion formed in the first material and over the second material including the second thinned portion. The folding of the remaining portion of the first material over the thinned portion of the first material and the second material forms the top layer of the wearable band. Additionally, the thinned portion of the first material, the second material and the seam created therebetween form the bottom layer of the wearable band.

In another non-limiting example, creating the seam in operation 214 can include positioning the seam on an end of the wearable band between the bottom layer and the top layer. The seam positioned on the end of the wearable band is also positioned adjacent an attachment component of the wearable band, which is configured to couple the wearable band to a housing of an electronic device, as discussed herein. In the non-limiting example, positioning the seam on the end of the wearable band between the bottom layer and the top layer includes folding the first material around the attachment component and over the second material, where the first material forms the top layer of the wearable band and the second material forms the bottom layer of the wearable band.

Additionally, processes may be performed on the first material and the second material for forming the wearable band, as discussed herein. In a non-limiting example, adhesive or binder can be applied to at least a portion of the inner surface of the first material and/or the second material, and filler material can be positioned over at least a portion of the inner surface of the first material and/or the second material. Additionally, adhesive or binder can be applied to the inner surface of the first material forming the top layer of the wearable band to adhere the top layer to the filler material. The filler material is positioned between the bottom layer and the top layer of the wearable band to provide structure, support, padding and/or rigidity to the wearable band. The top layer, the bottom layer and the filler material can be subsequently compressed to ensure the top layer and/or the bottom layer are coupled to and/or adhered to the filler material and/or to one another.

In further non-limiting examples, the first material and second materials, once secured together via the seam and/or the compression process, can be cut (e.g., die cut) to a final shape for the wearable band and, subsequently, the cut edges of the wearable band can undergo final treatment processes. The final treatment processes performed on the cut edges of the wearable band can include, but are not limited to, sanding, shaping, and painting.

One may appreciate that, although many embodiments are disclosed herein, that the operations and steps presented with respect to processes, methods and techniques described herein are meant as exemplary and accordingly are not exhaustive. One may further appreciate that alternate step order or fewer or additional steps may be required or desired for particular embodiments. Additionally, one may appreciate that, although depicted as being performed in consecutive steps, at least some of the operations discussed herein may be performed simultaneously.

FIGS. 3A-3E show side cross-section views of first material 328 and second material 330 undergoing the example process 200 for wearable band 310 (see, FIG. 3E) for electronic device 100 (see, FIGS. 1A and 1B) as discussed herein with respect to FIG. 2. It is understood that similarly numbered and/or named components may function in a substantially similar fashion. Redundant explanation of these components has been omitted for clarity.

Figure 3A:
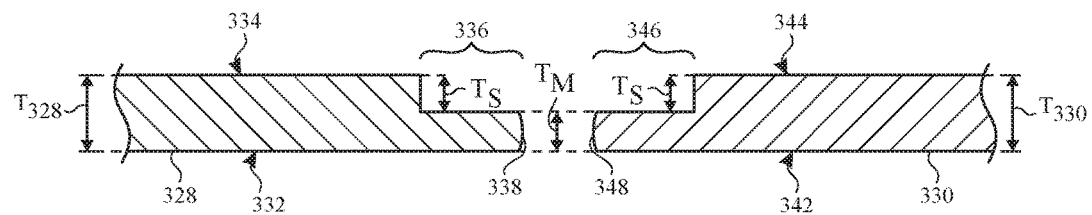
FIG. 3A shows a side cross-section view of two distinct pieces of material used to form a wearable band for a wearable electronic device, according to embodiments.

FIG. 3A shows a side cross-section view of first material 328 and second material 330. First material 328 and second material 330 are both formed from leather material, but each leather material forming first material 328 and second material 330 may be different colors to produce a two-tone wearable band 310 (see, FIG. 3E) for electronic device 100 (see, FIGS. 1A and 1B). As shown in FIG. 3A and as discussed herein, first material 328 has a thickness ($T_{328}$) and second material 330 has a thickness ($T_{330}$). In the non-limiting example, the thickness ($T_{328}$) of first material 328 is substantially similar and/or equal to the thickness ($T_{330}$) of second material 330.

As shown in FIG. 3A, first material 328 includes an outer surface 332 and an inner surface 334 positioned opposite the outer surface 332. Additionally, second material 330 includes an outer surface 342 and an inner surface 344 positioned opposite the outer surface 342. As discussed herein, the respective outer surfaces 332, 342 of first material 328 and second material 330 form an outer surface for wearable band 310 formed from first material 328 and second material 330 (see, FIG. 3E). The respective inner surfaces 334, 344 of first material 328 and second material 330 may not be visible in wearable band 310.

FIG. 3A shows first material 328 and second material 330 subsequent to undergoing a material thinning process (e.g., skiving or material splitting). Thinning, as discussed herein, is a process of removing a thickness of material from first material 328 and second material 330, respectively. As discussed herein, the thinning process removes or thins at least a portion of first material 328 and second material 330 such that the thinned portions of the materials include a thickness less than that of the thickness ($T_{328}$, $T_{330}$) of the remaining portion (e.g., unaltered or not-thinned portions) of each respective material. First material 328 and second material 330 may be thinned using any suitable material thinning device or system and/or using any suitable material thinning technique or process. In non-limiting examples, first material 328 and second material 330 are thinned by undergoing a skiving process or a material splitting process, as discussed herein.

As shown in FIG. 3A, first material 328 includes a first materially thinned portion 336 (hereafter, "thinned portion 336") formed on and/or adjacent end 338. Additionally, first thinned portion 336 is formed on and/or within inner surface 334 of first material 328. First thinned portion 336 is formed by thinning and/or removing a thickness of material from a portion of first material 328 at or on inner surface 334. In a non-limiting example, first thinned portion 336 includes a material thickness ($T_M$) that is approximately half the thickness ($T_{328}$) of the remaining portion of first material 328. That is, and as shown in FIG. 3A, the material thickness ($T_M$) of first thinned portion 336 is equal to a thinned depth or thickness ($T_S$) of the material removed from first thinned portion 336 of first material 328. Both the material thickness ($T_M$) and the thinned depth or thickness ($T_S$) for first thinned portion 336 are equal to half the thickness ($T_{328}$) of first material 328.

Also shown in FIG. 3A, second material 330 includes a second materially thinned portion 346 (hereafter, "thinned portion 346") formed on and/or adjacent end 348 of second material 330. Second thinned portion 346 is formed on and/or within inner surface 344 of second material 330. In a non-limiting example, and similar to first thinned portion 336 of first material 328, second thinned portion 346 includes a material thickness ($T_M$) that is approximately half the thickness ($T_{330}$) of the remaining portion of second material 330. As shown in FIG. 3A, the material thickness ($T_M$) of second thinned portion 346 is equal to a thinned depth or thickness ($T_S$) of the material removed from second thinned portion 346 of second material 330. Both the material thickness ($T_M$) and the thinned depth or thickness ($T_S$) for second thinned portion 346 are equal to half the thickness ($T_{330}$) of second material 330. Additionally, and because first material 328 and second material 330 include similar thicknesses ($T_{328}$, $T_{330}$), the material thickness ($T_M$) of second thinned portion 346 of second material 330 is substantially equal to the material thickness ($T_M$) of first thinned portion 336 of first material 328.

The processes performed on first material 328 and second material 330 as shown and discussed herein with respect to FIG. 3A may correspond to operations 202 and 204 of the process 200 shown in FIG. 2.

Figure 3B:
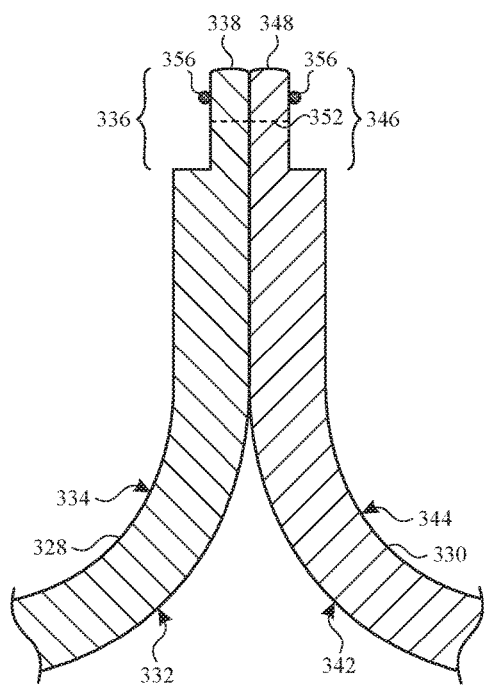
FIG. 3B shows a side cross-section view of the two distinct pieces of material of FIG. 3A sewn together, according to embodiments.

FIG. 3B shows first material 328 positioned adjacent second material 330. Specifically, FIG. 3B shows end 338 of first material 328 positioned adjacent end 348 of second material 330. Ends 338, 348 of first material 328 and second material 330 are substantially aligned and/or are positioned in a common plane. Additionally, first thinned portion 336 of first material 328 is positioned adjacent second thinned portion 346 of second material 330. In the non-limiting example shown in FIG. 3B, in order to position ends and/or thinned portions 336, 346 to be adjacent one another, at least a portion of outer surface 332 of first material 328 may contact and/or touch a portion of outer surface 342 of second material 330. As a result of outer surface 332 of first material 328 contacting outer surface 342 of second material 330, inner surface 334 of first material 328 is positioned opposite and/or faces away from inner surface 344 of second material 330.

Additionally as shown in FIG. 3B, first material 328 and second material 330 are releasably and/or temporarily coupled. First material 328 and second material 330 are releasably and/or temporarily coupled using temporary coupler 356. In the non-limiting example shown in FIG. 3B, temporary coupler 356 is configured as a clamp or pin positioned adjacent ends 338, 348 and positioned on and/or clamping first thinned portion 336 and second thinned portion 346 together. Temporary coupler 356 temporarily couples and/or holds first material 328 and second material 330 together to ensure that ends 338, 348, first thinned portion 336 and second thinned portion 346, and/or first material 328 and second material 330 remain aligned when a coupling component 352, such as a thread (hereafter, "thread 352"), is sewn through first material 328 and second material 330, as discussed herein. Although shown and discussed herein as a clamp or a pin, it is understood that temporary coupler 356 may be configured as any temporary coupler that releasably and/or temporarily couples end 338 of first material 328 to end 348 of second material 330. In non-limiting examples, temporary coupler 356 can be tape wrapped around first material 328 and second material 330, a temporary stitch formed through first material 328 and second material 330 and/or temporary adhesive formed between outer surface 332 of first material 328 and outer surface 342 of second material 330. Additionally, although shown and discussed herein as a thread, coupling component 352 may be formed from any suitable material, component and/or device configured to couple first material 328 to second material 330 including, but not limited to, yarn, manufactured-industrial line, adhesive and the like.

Thread 352 is also sewn through first material 328 and second material 330. As shown in FIG. 3B, thread 352 is sewn through first thinned portion 336 of first material 328 and second thinned portion 346 of second material 330. Additionally, thread 352 is positioned adjacent end 338 of first material 328 and end 348 of second material 330, respectively. Thread 352 is sewn through first thinned portion 336 and second thinned portion 346 to affix or couple first material 328 to second material 330, and more specifically, to affix or couple first thinned portion 336 to second thinned portion 346. As discussed herein, thread 352 is formed from any suitable material that may be sewn and/or woven through first material 328 and second material 330 to couple, affix and/or secure first material 328 to second material 330.

The processes performed on first material 328 and second material 330 as shown and discussed herein with respect to FIG. 3B may correspond to operations 206 and 208 of the process 200 shown in FIG. 2.

Figure 3C:
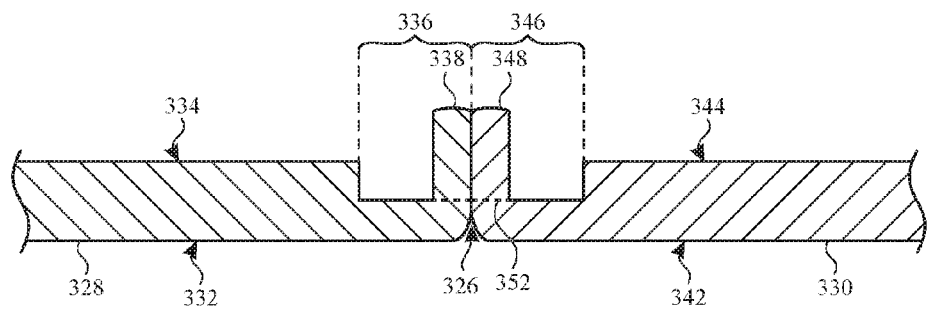
FIG. 3C shows a side cross-section view of the two distinct pieces of material of FIG. 3B forming a seam, according to embodiments.
Figure 3D:
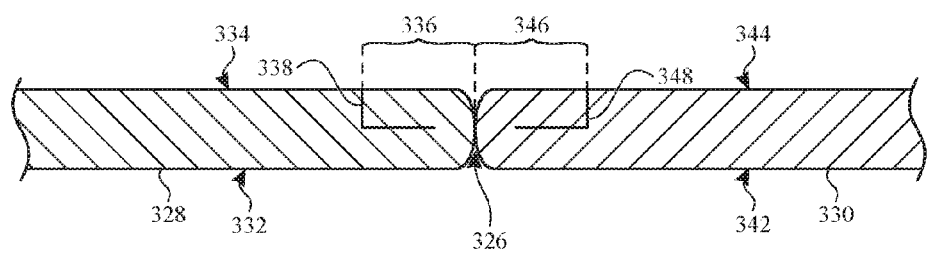
FIG. 3D shows a side cross-section view of the two distinct pieces of material of FIG. 3C with the thinned portions folded onto themselves, according to embodiments.

FIGS. 3C and 3D show first material 328 and second material 330 subsequent to sewing thread 352 (see, FIG. 3C) through first thinned portion 336 and second thinned portion 346 to couple first material 328 and second material 330. Specifically, FIG. 3C shows first thinned portion 336 and second thinned portion 346 prior to being folded onto themselves, and FIG. 3D shows first thinned portion 336 and second thinned portion 346 subsequent to being folded onto themselves. Thread 352 has been removed from FIG. 3D to more clearly shown first thinned portion 336 and second thinned portion 346 folded onto themselves.

Figure 3E:
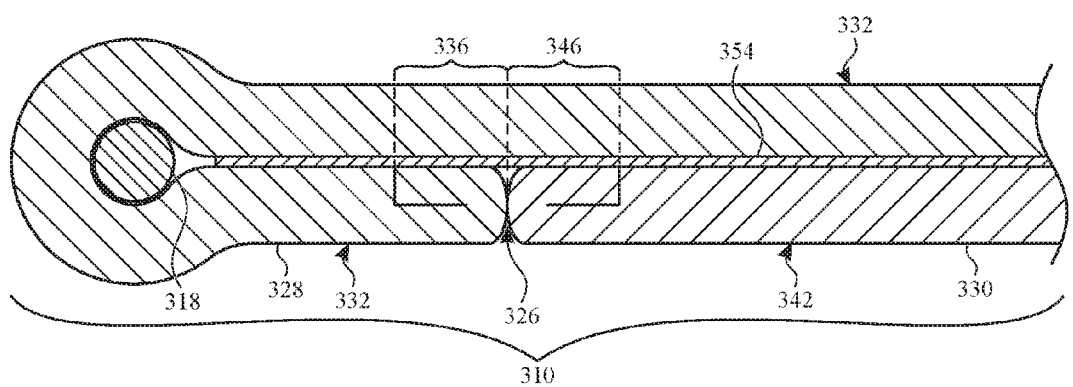
FIG. 3E shows a side cross-section view of the two distinct pieces of material of FIG. 3D forming the wearable band for a wearable electronic device, according to embodiments.

As shown in FIGS. 3C and 3D, first material 328 and second material 330 may be substantially flattened, spread out and/or separated after thread 352 (see, FIG. 3C) is sewn through first material 328 and second material 330. As shown in FIGS. 3C and 3D, only a portion of outer surface 332 of first material 328 contacts the portion of outer surface 342 of second material 330 positioned adjacent second thinned portion 346. The portion of outer surface 332 of first material 328 contacting outer surface 342 of second material 330 is positioned adjacent first thinned portion 336. Additionally, the portion of outer surface 342 of second material 330 contacting outer surface 332 of first material 328 is positioned adjacent second thinned portion 346. As shown in FIGS. 3C-3E, the portion of outer surface 332 of first material 328 permanently contacts the portion of outer surface 342 of second material 330 as a result of first material 328 and second material 330 being coupled by thread 352.

Additionally as shown in FIG. 3C, the formation or creating of seam 326 may be initially depicted. That is, after sewing first thinned portion 336 of first material 328 to second thinned portion 346 of second material 330, and subsequently separating first material 328 and second material 330, seam 326 may be formed on and/or between outer surface 332 of first material 328 and outer surface 342 of second material 330. Although initially shown as being formed in FIG. 3C, the positioning of seam 326 within wearable band 310 formed from first material 328 and second material 330 is determined when first material 328 is folded around an attachment component 318 and/or over second material 330, as discussed herein (see, FIG. 3E).

Turning to FIG. 3D, first thinned portion 336 of first material 328 is folded onto itself. First thinned portion 336 is folded onto itself such that end 338 of first material 328 is folded toward inner surface 334 of first material 328. Additionally, first thinned portion 336 is folded at or about thread 352 (see, FIG. 3C) sewn through first material 328.

Additionally, and similar to first thinned portion 336 of first material 328, second thinned portion 346 of second material 330 is folded onto itself. As shown in FIG. 3D, second thinned portion 346 is folded onto itself such that end 338 of first material 328 is folded toward inner surface 344 of second material 330. Additionally, second thinned portion 346 is folded at or about thread 352 (see, FIG. 3C) sewn through second material 330.

Additionally as shown in FIG. 3D, when first thinned portion 336 is folded onto itself and second thinned portion 346 is folded onto itself, first material 328 and second material 330 may include substantially uniform thicknesses. In a non-limiting example, folding first thinned portion 336 onto itself results in first material 328 having a uniform thickness ($T_{328}$). First material 328 has a uniform thickness ($T_{328}$) once first thinned portion 336 is folded onto itself as a result of first thinned portion 336 having a material thickness ($T_M$) that is approximately half of overall thickness ($T_{128}$) of first material 328 (see, FIG. 3A). As shown in FIG. 3D, forming a uniform thickness ($T_{328}$) throughout first material 328 also results in first thinned portion 336 being in planar alignment with inner surface 334 of first material 328.

Similar to first material 328, folding second thinned portion 346 onto itself results in second material 330 having a uniform thickness ($T_{330}$). Second material 330 has a uniform thickness ($T_{330}$) once second thinned portion 346 is folded onto itself as a result of second thinned portion 346 having a material thickness ($T_M$) that is approximately half of overall thickness ($T_{330}$) of second material 330 (see, FIG. 3A). Additionally, because the thickness ($T_{330}$) of second material 330 is equal to the thickness ($T_{328}$) of first material 328, the thicknesses of first material 328 and second material 330 do not vary between first thinned portion 336 and second thinned portion 346 once the respective thinned portions 336, 346 are folded onto themselves. As shown in FIG. 3D, forming a uniform thickness ($T_{330}$) throughout second material 330 also results in second thinned portion 346 being in planar alignment with inner surface 344 of second material 330. Also because the thickness ($T_{330}$) of second material 330 is equal to the thickness ($T_{328}$) of first material 328, second thinned portion 346 is in planar alignment with inner surface 334 of first material 328.

The processes performed on first material 328 and second material 330 as shown and discussed herein with respect to FIGS. 3C and 3D may correspond to operations 210 and 212 of the process 200 shown in FIG. 2.

FIG. 3E shows wearable band 310 formed from first material 328 and second material 330 in an operational or final state. Similar to FIG. 3D, thread 352 has been removed from FIG. 3E to more clearly show first thinned portion 336 and second thinned portion 346 formed onto themselves as wearable band 310 is formed. As shown in FIG. 3E, first material 328 and second material 330 forming wearable band 310 are coupled together and positioned adjacent one another. Specifically, a remaining portion (e.g., not-thinned portion) of first material 328 excluding the thinned portion is folded over first thinned portion 336 of first material 328 and the entirety of second material 330 including second thinned portion 346. Folding first material 328 over first thinned portion 336 and second material 330 including second thinned portion 346 also includes positioning first material 328 to substantially surround and/or be folded over attachment component 318. Inner surface 334 of first material 328 is positioned adjacent to, contacts and/or is coupled to attachment component 318 when surrounding and/or folded over attachment component 318.

As discussed herein, folding first material 328 over attachment component 318 determines the position of seam 326 within wearable band 310. In non-limiting examples, the amount of first material 328 that is folded over and/or around attachment component 318 and/or the position or proximity of attachment component 318 to first thinned portion 336 of first material 328 determines where on wearable band 310 seam 326 is formed. In the non-limiting example shown in FIG. 3E, and as discussed herein, the remaining portion of first material 328 is folded over and/or around attachment component 318 and is folded and/or positioned over first thinned portion 336 of first material 328 and the entirety of second material 330 including second thinned portion 346. As such, seam 326 is formed on the bottom layer of wearable band 310. As shown in FIG. 3E, the remaining portion of first material 328 forms the top layer of wearable band 310. Additionally, first thinned portion 336 of first material 328 and second material 330 including second thinned portion 346 form the bottom layer of wearable band 310. Seam 326 is formed between first thinned portion 336 and second thinned portion 346 on the bottom layer. As discussed herein, where seam 326 is formed on the bottom layer of wearable band 310, seam 326 contacts a user's wrist when electronic device 100 is worn by a user and/or seam 326 is not visible when a user is wearing electronic device 100.

Prior to folding first material 328 over first thinned portion 336 of first material 328 and second material 330 including second thinned portion 346, filler material 354 is positioned over first thinned portion 336 and second material 330. As shown in FIG. 3E, filler material 354 is positioned adjacent attachment component 318 and substantially covers first thinned portion 336 of first material 328 and second material 330 including second thinned portion 346. Filler material 354 is positioned over first thinned portion 336 and second material 330 forming a bottom layer prior to first material 328 being folded over the bottom layer to form the top layer. As a result, and as shown in FIG. 3E, filler material 354 is positioned between the top layer and the bottom layer of wearable band 310. Filler material 354 includes a uniform thickness in order to maintain a consistent thickness through wearable band 310.

Although not shown, it is understood that filler material 354 may be coupled to the first material 328 and second material 330 using any suitable adhering or bonding component and/or any coupling technique. In a non-limiting example, filler material 354 can be coupled to the materials (e.g., first material 328, second material 330) forming the top layer and the bottom layer of wearable band 310 using an adhesive. As discussed herein, filler material 354 is positioned between the top layer and bottom layer of wearable band 310 to provide structure, support, padding and/or rigidity to wearable band 110. As such, filler material 354 may be formed from any suitable material including plastic, woven material and/or excess material removed of first material 328 and/or second material 330 when forming wearable band 310, as discussed herein. In another non-limiting example, filler material 354 may be formed from a fiber-spun liquid crystal polymer material (e.g., Vectran) that is positioned between the top layer and the bottom layer of wearable band 310 to prevent first material 328 and second material 330 from stretching over the operational life of wearable band 310.

The processes performed on first material 328 and second material 330 as shown and discussed herein with respect to FIG. 3E may correspond to operation 214 of the process 200 shown in FIG. 2.

Although the portion of first material 328 of wearable band 310 wrapped around, surrounding and/or positioned adjacent attachment component 318 is depicted as thicker than the total thickness of first material 328, second material 330 and filler material 354, it is understood that the thickness may be substantially uniform around attachment component 318. That is, the thickness of the portion of wearable band 310 formed adjacent attachment component 318 may be substantially uniform with the remaining thickness of wearable band 310. In another non-limiting example, the thickness of the portion of wearable band 310 formed adjacent attachment component 318 may be thicker than the remaining portion of wearable band 310 by an unperceivable amount by a user of electronic device 100 (see, FIGS. 1A and 1B). As such, the difference or variation in thicknesses in wearable band 310 may not be visible, detectable or identifiable by a user of wearable band 310.

Additionally, although shown as being substantially circular in shape, it is understood that attachment component 318 may be formed as any geometry. In another non-limiting example, attachment component 318 can be a substantially rectangular shape which can flatten or reduce the thickness of the portion of wearable band 310 including attachment component 318 to be substantially uniform with the remaining portion of wearable band 310, as discussed herein. Additionally, attachment component 318 can be formed with a smaller size, geometry or dimension than depicted. The smaller size, geometry or dimension may also reduce the thickness of the portion of wearable band 310 including attachment component 318.

Figure 4:
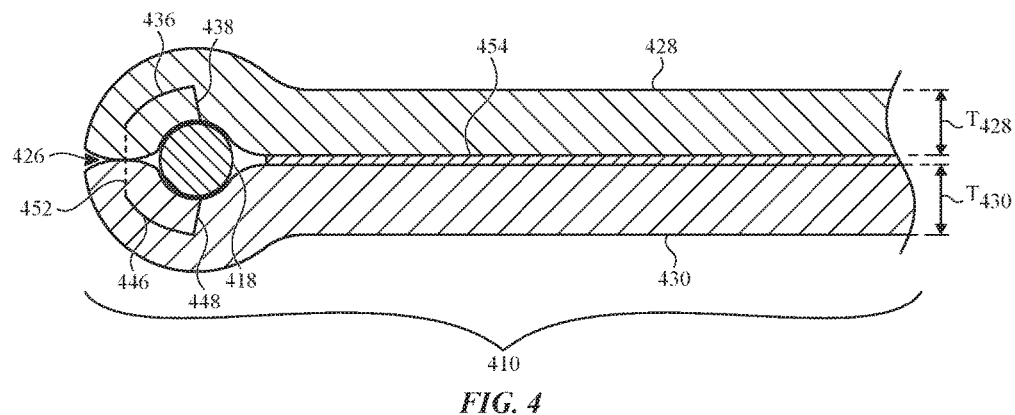
FIG. 4 shows a side cross-section view of a portion of a wearable band having a seam formed between a top layer and bottom layer of the wearable band, according to embodiments.

As discussed herein, folding the first material over the attachment component of the electronic device determines the position of the seam formed within the wearable band of the electronic device. FIG. 4 shows another non-limiting example of wearable band 410. Wearable band 410 is formed from first material 428 and second material 430, which are substantially similar to first material 328 and second material 330 discussed herein with respect to FIGS. 3A-3E. Specifically, first material 428 and second material 430 include identical thicknesses ($T_{428}$, $T_{430}$), and undergo similar steps of process 200, as discussed herein with respect to FIG. 2 and shown herein with respect to FIGS. 3A-3D. Redundant explanation of these similar components and similar process steps has been omitted for clarity.

However, distinct from wearable band 310 shown in FIG. 3E, seam 426 is formed on an end of wearable band 410. As shown in FIG. 4, seam 426 formed between first material 428 and second material 430 is positioned adjacent attachment component 418, and is formed between a top layer of wearable band 410 formed by first material 428, and a bottom layer formed by second material 430. Seam 426 is formed on the end of wearable band 410 by positioning first thinned portion 436 of first material 428 and second thinned portion 446 of second material 430 directly adjacent attachment component 418. Additionally, first material 428 and second material 430 are folded or wrapped around attachment component 418, and first material 428 is positioned over second material 430. Distinct from wearable band 310 shown in FIG. 3E, first thinned portion 436 and second thinned portion 446 are not covered by first material 428. As shown in FIG. 4, only the remaining portion of second material 430 is covered by the remaining portion of first material 428. As a result of forming seam 426 on the end of wearable band 410 and/or between the top layer and the bottom layer, seam 426 is positioned adjacent a housing of the electronic device (see, FIGS. 1A and 1B) and may not be visible or easily seen by a user of wearable band 310.

Figure 5A:
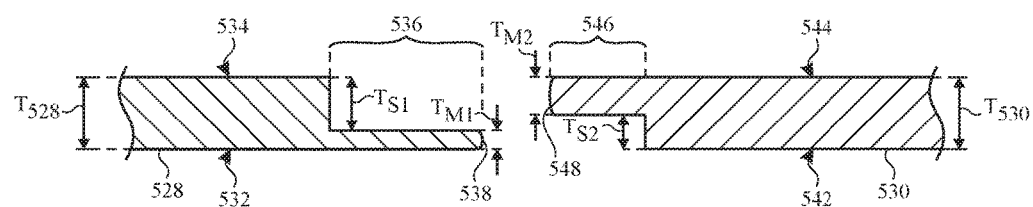
FIG. 5A shows a side cross-section view of two distinct pieces of material used to form a wearable band for a wearable electronic device, according to additional embodiments.
Figure 5B:
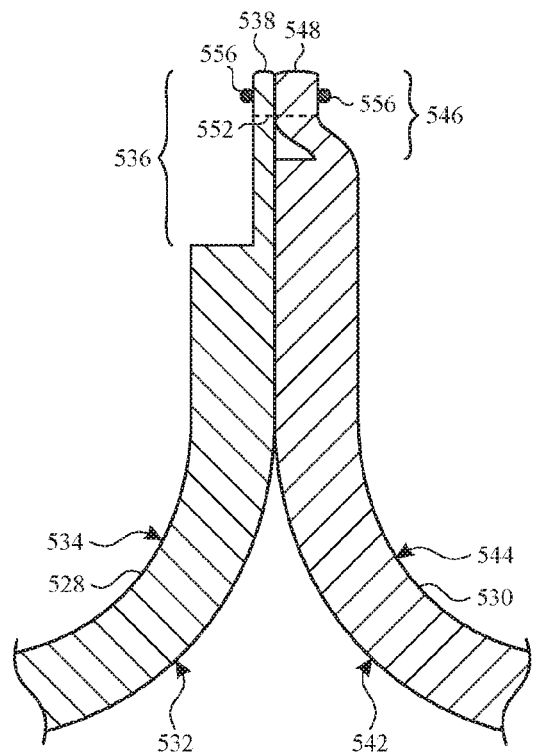
FIG. 5B shows a side cross-section view of the two distinct pieces of material of FIG. 5A sewn together, according to additional embodiments.
Figure 5C:
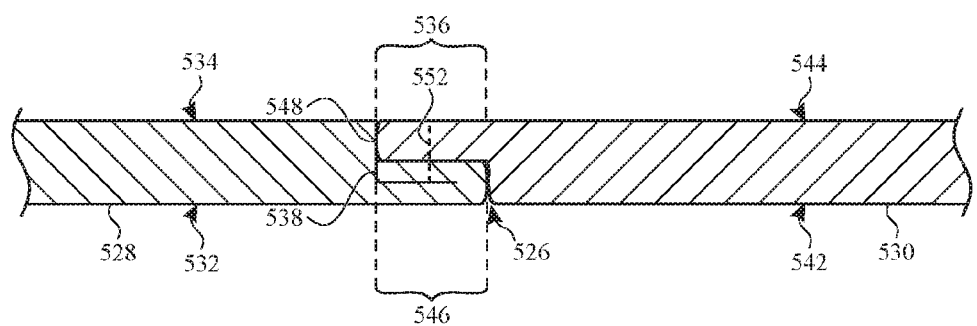
FIG. 5C shows a side cross-section view of the two distinct pieces of material of FIG. 5B with a first thinned portion folded onto itself and a second thinned portion folded onto the first thinned portion, according to embodiments.

FIGS. 5A-5C show side cross-section views of first material 528 and second material 530 forming wearable band 510 for electronic device 100 (see, FIGS. 1A and 1B). First material 528 and second material 530 undergo some similar steps as those discussed herein with respect to process 200, and as shown in FIGS. 3A-3E. However, first material 528 and second material 530 include distinct features discussed in detail below and, as such, undergo distinct steps from those discussed herein with respect to FIG. 2, and as shown in FIGS. 3A-3E. It is understood that similarly numbered and/or named components may function in a substantially similar fashion. Redundant explanation of these components has been omitted for clarity.

FIG. 5A shows a side cross-section view of first material 528 and second material 530 subsequent to undergoing a thinning process. In a non-limiting example shown in FIG. 5A and as similarly discussed herein with respect to FIG. 3A, first material 528 has a thickness ($T_{528}$) and second material 530 has a thickness ($T_{530}$). In the non-limiting example, the thickness ($T_{528}$) of first material 528 is substantially similar and/or equal to the thickness ($T_{530}$) of second material 530.

Distinct from FIG. 3A, the thinned portions 536, 546 of first material 528 and second material 530 have different material thicknesses ($T_{M1}$, $T_{M2}$) and/or are formed through different surfaces. As shown in FIG. 5A, first material 528 includes first thinned portion 536 having a material thickness ($T_{M1}$) that is less than approximately half the thickness ($T_{528}$) of first material 528. Additionally, material thickness ($T_{M1}$) of first thinned portion 536 is less than the thinned depth or thickness ($T_{S1}$) of the material removed from first thinned portion 536 of first material 528. In the non-limiting example shown in FIG. 5A, the material thickness ($T_{M1}$) of first thinned portion 536 is approximately one-quarter (¼) or a fourth of the thickness ($T_{528}$) of first material 528.

Second material 530 is distinct from second material 330 discussed herein with respect to FIG. 3A. Specifically, second thinned portion 546 is formed on and/or through outer surface 542 of second material 530, and includes a material thickness ($T_{M2}$) that is approximately half the thickness ($T_{530}$) of second material 530. As shown in FIG. 5A, the material thickness ($T_{M2}$) of second thinned portion 546 formed in outer surface 542 is equal to a thinned depth or thickness ($T_{S2}$) of the material removed from second thinned portion 546 of second material 530. The material thickness ($T_{M2}$) and thinned thickness ($T_{S2}$) of second material 530 are equal to half the thickness ($T_{530}$) of second material 530. Additionally, and because first material 528 and second material 530 include similar thicknesses ($T_{528}$, $T_{530}$), the material thickness ($T_{M2}$) of second thinned portion 546 of second material 530 is substantially greater than the material thickness ($T_{M1}$) of first thinned portion 536 of first material 528. In the non-limiting example, the material thickness ($T_{M1}$) of first thinned portion 536 of first material 528 is approximately half of the material thickness ($T_{M2}$) of second thinned portion 546 of second material 530.

FIG. 5B shows first material 528 coupled to second material 530. Specifically, and similarly discussed herein with respect to FIG. 3B, thread 552 is sewn through first thinned portion 536 of first material 528 and second thinned portion 546 of second material 530 to couple first material 528 to second material 530. Distinct from first material 328 and second material 330 shown in FIGS. 3A and 3B, FIGS. 5A and 5B show that thinned portions 536, 546 have different lengths and/or are formed into the respective materials (e.g., first material 528, second material 530) at different lengths. As shown in FIG. 5B, the length of first thinned portion 536 is longer than second thinned portion 546. Similar to second material 330 discussed and shown herein with respect to FIG. 3B, thread 552 is sewn through approximately the halfway or midway length of second thinned portion 546 of second material 530. Distinct from second material 530, and as a result of the longer length of first thinned portion 536, thread 552 is formed through a portion of first thinned portion 536 that is less than the halfway or midway length of first thinned portion 536, and is sewn substantially adjacent end 538 of first material 528. As discussed herein, the varying length between first thinned portion 536 and second thinned portion 546 relates to how thinned portions 536, 546 of the materials 528, 530 are folded when forming a wearable band.

Additionally as shown in FIG. 5B, second material 530 is substantially bent, shaped and/or displaced into first material 528 to sew thread 552 through first thinned portion 536 and second thinned portion 546. That is, as a result of second thinned portion 546 being formed in outer surface 542 of second material 530 and because outer surface 542 of second material 530 contacts outer surface 532 of first material 528 during the coupling or sewing process, second thinned portion 546 is displaced to contact first thinned portion 536. Second thinned portion 546 is displaced toward first thinned portion 536 to contact outer surface 532 of first material 528 in order for thread 552 to be sewn through both first thinned portion 536 and second thinned portion 546. As similarly discussed herein, thread 552 is sewn through first thinned portion 536 and second thinned portion 546 to couple first material 528 and second material 530.

FIG. 5C shows thinned portions 536, 546 subsequently folded onto the first thinned portion 536 of first material 528. As shown in FIG. 5C, and distinct from FIG. 3D, first thinned portion 536 of first material 528 and second thinned portion 546 of second material 530 are both folded and/or positioned over first thinned portion 536 of first material 528. First thinned portion 536 of first material 528 is initially folded onto and/or over itself, adjacent thread 452. Additionally, end 538 of first material 528 is folded toward inner surface 534. Because first thinned portion 536 includes a material thickness ($T_{M1}$) (see, FIG. 5A) that is less than half the thickness ($T_{528}$) of first material 528, first thinned portion 536 and end 538 are positioned below and/or not in alignment with inner surface 534 of first material 528. In the non-limiting example discussed herein where the material thickness ($T_{M1}$) of first thinned portion 536 is a fourth of the thickness ($T_{528}$) of first material 528, folded first thinned portion 536 has a thickness equal to half of the thickness ($T_{528}$) of first material 528.

After first thinned portion 536 is folded onto itself, second thinned portion 546 of second material 530 is folded and/or positioned over folded, first thinned portion 536 of first material 528. As discussed herein, first material 528 and second material 530 include similar thicknesses ($T_{528}$, $T_{530}$) and the material thickness ($T_{M2}$) of second thinned portion 546 is equal to half of the thickness ($T_{530}$) of second material 530 and the thickness ($T_{528}$) of first material 528, respectively. Additionally, and as discussed above, folded, first thinned portion 536 has a thickness equal to half the thickness ($T_{528}$) of first material 528. As a result, when second thinned portion 546 of second material 530 is positioned over folded, first thinned portion 536, the collective thickness of folded, first thinned portion 536, and second thinned portion 546 is equal to the thickness ($T_{528}$) of first material 528 and the thickness ($T_{530}$) of second material 530, respectively. Additionally, second thinned portion 546 of second material 530 is in planar alignment with inner surface 534 of first material 528 and inner surface 544 of second material 530, respectively. As shown in FIG. 5C, folding first thinned portion 536 onto itself and subsequently folding second thinned portion 546 over folded, first thinned portion 536, results in first material 528 and second material 530 with substantially uniform thicknesses throughout the individual material and with respect to one another.

Figure 6A:
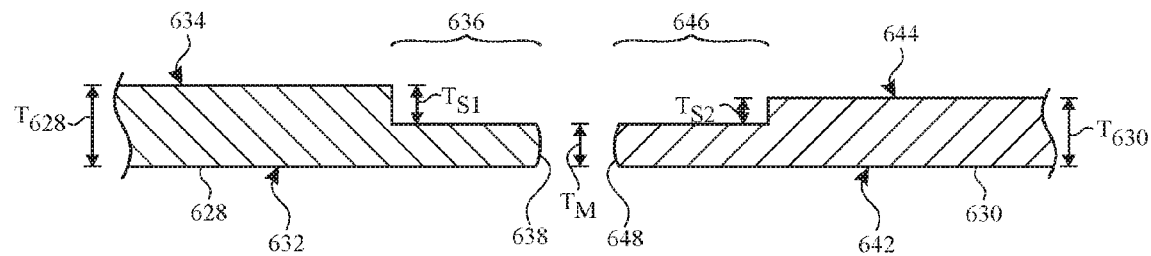
FIG. 6A shows a side cross-section view of two distinct pieces of material having distinct thickness used to form a wearable band for a wearable electronic device, according to embodiments.
Figure 6B:
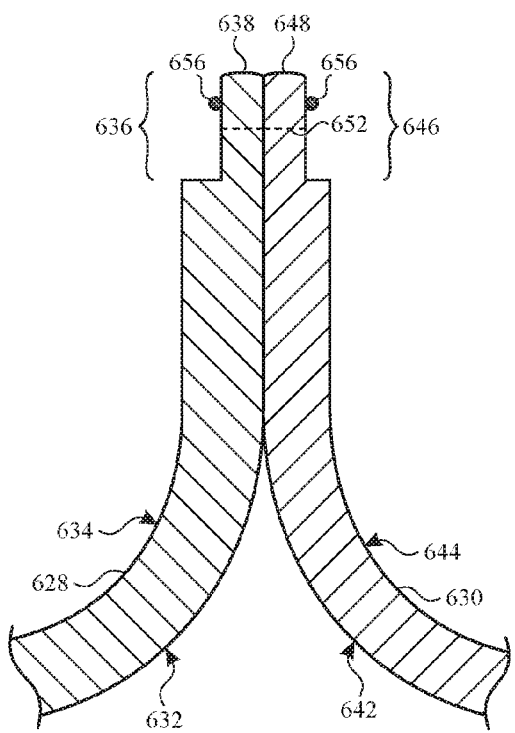
FIG. 6B shows a side cross-section view of the two distinct pieces of material of FIG. 6A sewn together, according to embodiments.
Figure 6C:
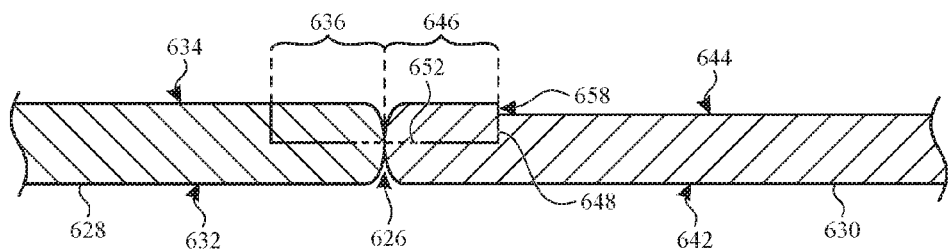
FIG. 6C shows a side cross-section view of the two distinct pieces of material of FIG. 6B with thinned portions folded onto themselves, according to embodiments.
Figure 6D:
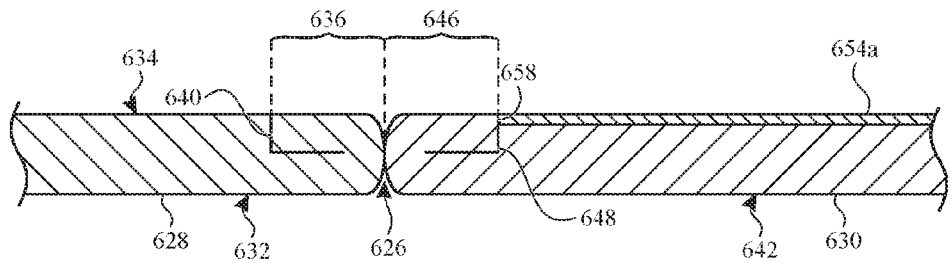
FIG. 6D shows a side cross-section view of the two distinct pieces of material of FIG. 6C including a filler material, according to embodiments.
Figure 6E:
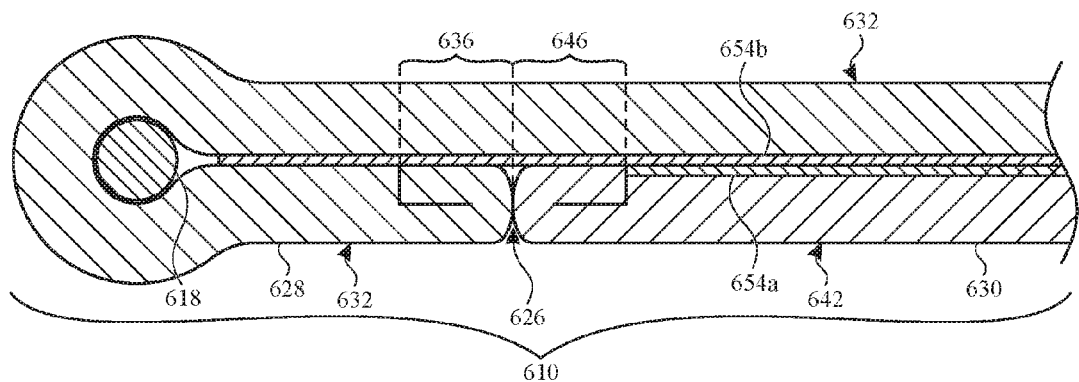
FIG. 6E shows a side cross-section view of the two distinct pieces of material of FIG. 6D forming the wearable band for a wearable electronic device, according to embodiments.

FIGS. 6A-6E show cross-section views of first material 628 and second material 630 forming wearable band 610 (see, FIG. 6E). Distinct from the non-limiting examples discussed herein, first material 628 and second material 630 include distinct thicknesses. In the non-limiting example shown in FIG. 6A, the thickness ($T_{628}$) of first material 628 is larger than the thickness ($T_{630}$) of second material 630.

As shown in FIG. 6A, and similarly discussed herein with respect to FIG. 3A, first material 628 includes first thinned portion 636 formed in inner surface 634 adjacent end 638, and second material 630 includes second thinned portion 646 formed in inner surface 644 adjacent end 648. First thinned portion 636 and second thinned portion 646 include a similar material thickness ($T_M$) for the material of first thinned portion 636 and second thinned portion 646, respectively. However distinct from those examples discussed herein, the material thickness ($T_M$) for the material of first thinned portion 636 and second thinned portion 646 is equal to half the thickness ($T_{628}$) of first material 628. As a result, the thinned depth or thickness ($T_{S1}$) of first thinned portion 636 is substantially equal to the material thickness ($T_M$) of first thinned portion 636. However, the thinned depth or thickness ($T_{S2}$) of second thinned portion 646 is not equal to the material thickness ($T_M$) of second thinned portion 646. Rather, the material thickness ($T_M$) of second thinned portion 646 is larger than the thinned depth or thickness ($T_{S2}$) of second thinned portion 646 as a result of second material 630 having a smaller thickness ($T_{630}$) than the thickness ($T_{628}$) of first material 628. Additionally, the material thickness ($T_M$) of second thinned portion 646 is larger than half the material thickness ($T_{630}$) of second material 630 as a result of second material 630 having a smaller thickness ($T_{630}$) than the thickness ($T_{628}$) of first material 628.

As shown in FIG. 6B, thread 652 is sewn through first thinned portion 636 and second thinned portion 646 to couple first material 628 to second material 630. Thread 652 being sewn through first thinned portion 636 and second thinned portion 646 to couple first material 628 to second material 630 may be substantially similar to that described herein with respect to FIGS. 3B and 5B. As such, redundant explanation is omitted.

FIG. 6C shows first thinned portion 636 and second thinned portion 646 subsequent to being folded onto themselves. Similar to FIG. 3D, first thinned portion 636 of first material 628 is folded onto itself and toward inner surface 634 of first material 628. As shown in FIG. 6C, and as a result of first thinned portion 636 having a material thickness ($T_M$) that is half of the thickness ($T_{628}$) of first material 628, when first thinned portion 636 is folded onto itself, first thinned portion 636 is in planar alignment with inner surface 634 of first material 628.

Additionally, and similar to first thinned portion 636 of first material 628, second thinned portion 646 of second material 630 is folded onto itself, toward inner surface 644 of second material 630. Second thinned portion 646 is folded onto itself at or about thread 652. However, distinct from first material 628, as a result of second thinned portion 646 having a material thickness ($T_M$) that is greater than half the thickness ($T_{630}$) of second material 630, when second thinned portion 646 is folded onto itself, second thinned portion 646 is not in planar alignment with inner surface 644 of second material 630. Instead, second thinned portion 646 includes an extended portion 658 that is positioned above inner surface 644. Although not in planar alignment with inner surface 644 of second material 630, because second thinned portion 646 has a material thickness ($T_M$) equal to half the thickness ($T_{628}$) of first material 628, second thinned portion 646 of second material 630 is in planar alignment with inner surface 634 of first material 628.

To achieve uniform thickness between first material 628 and second material 630, additional layers of filler material 654a are positioned over portions of second material 630. As shown in FIGS. 6D and 6E, first layer of filler material 654a is shaped or formed to have a thickness substantially equal to the height of extended portion 658 of second thinned portion 646. In the non-limiting example shown in FIG. 6D, first layer of filler material 654a is then positioned over and/or coupled to the remaining portion of second material 630, adjacent second thinned portion 646 having extended portion 658. Once positioned over the remaining portion of second material 630, second material 630 including extended portion 658 of second thinned portion 646 includes a uniform thickness. The new uniform thickness formed by covering the remaining portion of second material 630 with the first layer of filler material 654a is also equal to the thickness ($T_{628}$) of first material 628.

As a result of forming a uniform thickness for both first material 628 and second material 630, first material 628 and second material 630 as shown in FIG. 6D may undergo similar processes as discussed herein with respect to FIGS. 3D and 3E to form wearable band 610. In a non-limiting example, a second layer of filler material 654b is applied to and/or covers first thinned portion 636 of first material 628, the entirety of second material 630 including second thinned portion 646 and the first layer of filler material 654a. After the second layer of filler material 654b is formed over first material 628, second material 630 and the first layer of filler material 654a, the remaining portion of first material 628 is folded around and/or over attachment component 618 and over the second layer of filler material 654b to form wearable band 610 shown in FIG. 6E and as similarly discussed herein.

Figure 7A:
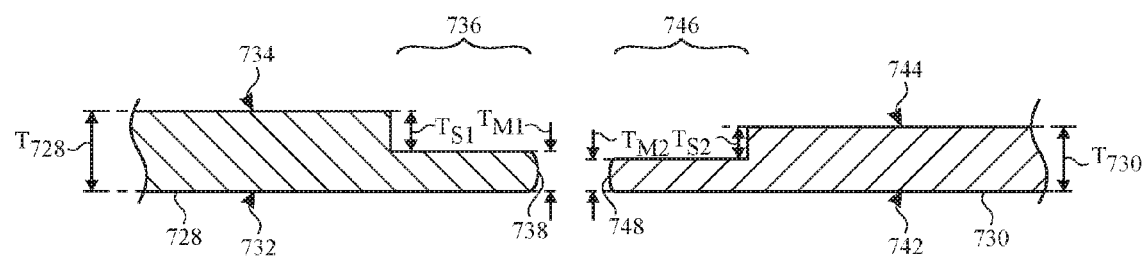
FIG. 7A shows a side cross-section view of two distinct pieces of material having distinct thickness used to form a wearable band for a wearable electronic device, according to additional embodiments.
Figure 7B:
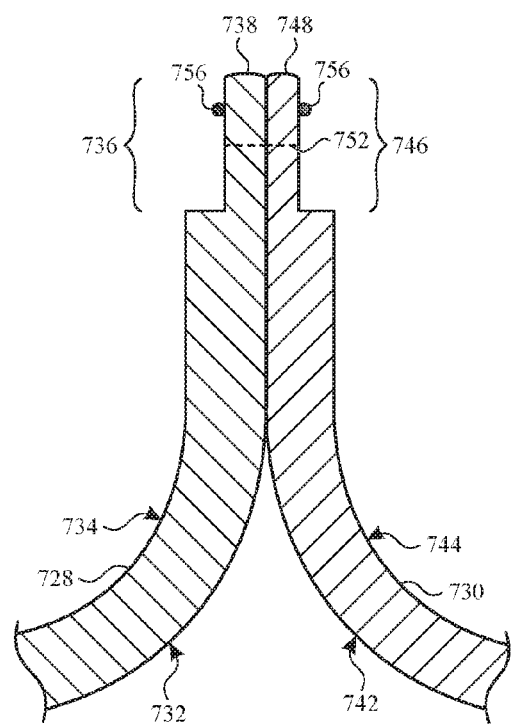
FIG. 7B shows a side cross-section view of the two distinct pieces of material of FIG. 7A sewn together, according to embodiments.
Figure 7C:
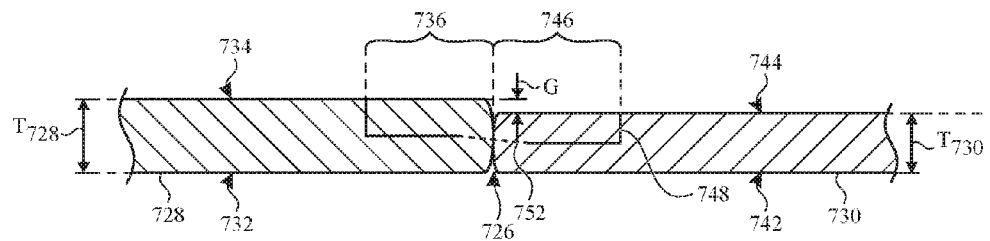
FIG. 7C shows a side cross-section view of the two distinct pieces of material of FIG. 7B with thinned portions folded onto themselves, according to embodiments.
Figure 7D:
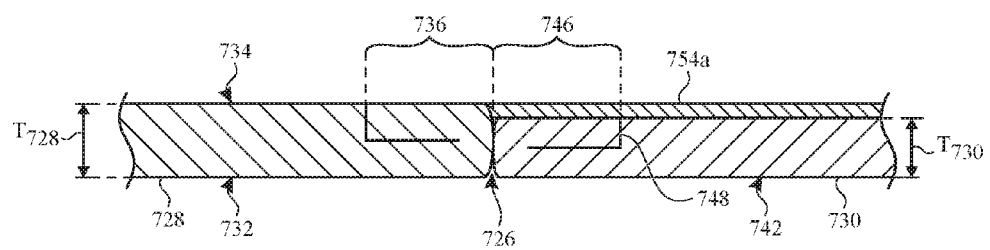
FIG. 7D shows a side cross-section view of the two distinct pieces of material of FIG. 7C including a filler material, according to embodiments.
Figure 7E:
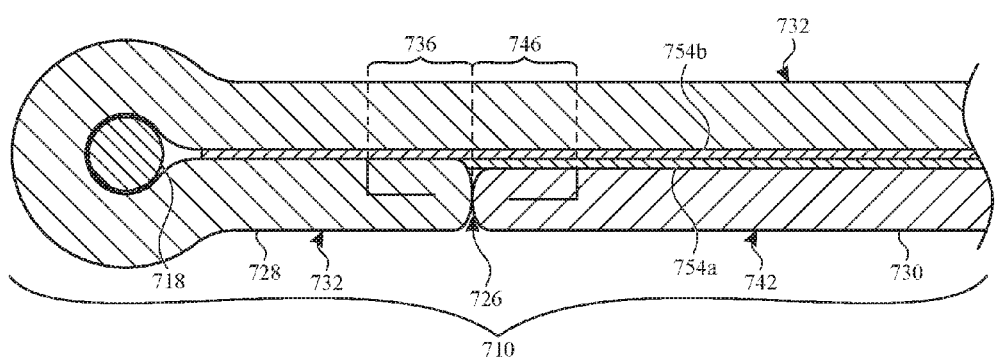
FIG. 7E shows a side cross-section view of the two distinct pieces of material of FIG. 7D forming the wearable band for a wearable electronic device, according to embodiments.

FIGS. 7A-7E show cross-section views of first material 728 and second material 730 forming wearable band 710 (see, FIG. 7E). Similar to FIGS. 6A-6E, first material 728 and second material 730 include distinct thicknesses, where the thickness ($T_{728}$) of first material 728 is larger than the thickness ($T_{730}$) of second material 730.

As shown in FIG. 7A, and similarly discussed herein, first material 728 includes first thinned portion 736, and second material 730 includes second thinned portion 746. Distinct from first material 628 and second material 630 discussed herein with respect to FIG. 6A, first thinned portion 736 and second thinned portion 746 include a distinct material thicknesses ($T_{M1}$, $T_{M2}$) for the material of first thinned portion 736 and second thinned portion 746, respectively. In the non-limiting example shown in FIG. 7A, the material thickness ($T_{M1}$) for first thinned portion 736 of first material 728 is identical to the thinned depth or thickness ($T_{S1}$), and approximately half the thickness ($T_{728}$) of first material 728. Additionally, the material thickness ($T_{M2}$) for second thinned portion 746 of second material 730 is identical to the thinned depth or thickness ($T_{S2}$), and approximately half the thickness ($T_{730}$) of second material 730. Because the thickness ($T_{728}$) of first material 728 is larger than the thickness ($T_{730}$) of second material 730, the material thickness ($T_{M1}$) for first thinned portion 736 of first material 728 is also larger than the material thickness ($T_{M2}$) for second thinned portion 746 of second material 730.

As shown in FIG. 7B, thread 752 is sewn through first thinned portion 736 and second thinned portion 746 to couple first material 728 to second material 730. Thread 752 being sewn through first thinned portion 736 and second thinned portion 746 to couple first material 728 to second material 730 may be substantially similar to that described herein with respect to FIGS. 3B and 5B. As such, redundant explanation is omitted.

FIG. 7C shows first thinned portion 736 and second thinned portion 746 subsequent to being folded onto themselves. Similar to FIG. 3D, first thinned portion 736 of first material 728 is folded onto itself. As shown in FIG. 7C, and as a result of first thinned portion 736 having a material thickness ($T_{M1}$) that is half of the thickness ($T_{728}$) of first material 728, folded, first thinned portion 736 is in planar alignment with inner surface 734 of first material 728.

Additionally, and similar to first thinned portion 736 of first material 728, second thinned portion 746 of second material 730 is folded onto itself. Also as a result of second thinned portion 746 having a material thickness ($T_{M2}$) that is half of the thickness ($T_{730}$) of second material 730, folded, second thinned portion 746 is in planar alignment with inner surface 744 of second material 730.

However, because first material 728 and second material 730 have distinct thicknesses, first material 728 and second material 730 may not be uniform with each other. As shown in FIG. 7C, inner surface 734 of first material 728 is not in planar alignment with inner surface 744 of second material 730 as a result of first material 728 having a thickness ($T_{728}$) that is larger than the thickness ($T_{730}$) of second material 730. As a result a gap (G) may be formed between inner surface 734 of first material 728 and inner surface 744 of second material 730.

To achieve uniform thickness between first material 728 and second material 730, additional layers of filler material 754a are positioned over second material 730. As shown in FIGS. 7D and 7E, and as similarly discussed herein with respect to FIGS. 6D and 6E, first layer of filler material 754a is shaped or formed to have a thickness substantially equal to the height of the gap (G) formed between inner surface 734 of first material 728 and inner surface 744 of second material 730. In the non-limiting example shown in FIG. 7D, first layer of filler material 754a is then positioned over and/or coupled to the entirety of second material 730. Once positioned over second material 730, second material 730 and filler material 754a includes a thickness that is substantially equal to the thickness ($T_{728}$) of first material 728.

As a result of forming a uniform or equal thickness for both first material 728 and second material 730, first material 728 and second material 730 as shown in FIG. 7D may undergo similar processes as discussed herein with respect to FIGS. 6D and 6E to form wearable band 710. In a non-limiting example, a second layer of filler material 754b is applied to and/or covers first thinned portion 736 of first material 728, the entirety of second material 730 including second thinned portion 746, and the first layer of filler material 754a. After the second layer of filler material 754b is formed over first material 728, second material 730 and the first layer of filler material 754a, first material 728 is folded around and/or over attachment component 718 and over the second layer of filler material 754b to form wearable band 710 shown in FIG. 7E and as similarly discussed herein.

Figure 8A:
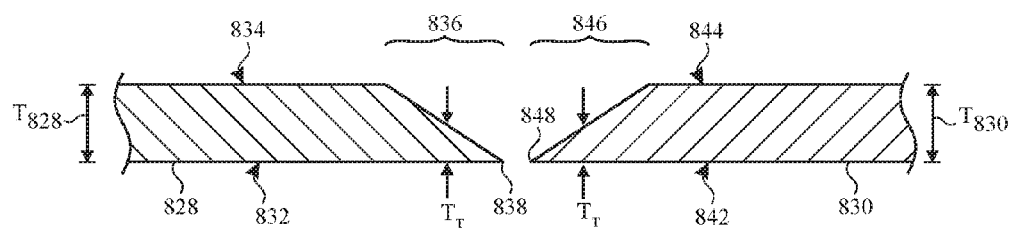
FIG. 8A shows a side cross-section view of two distinct pieces of material having thinned portions with a tapered thickness to form a wearable band for a wearable electronic device, according to embodiments.

FIGS. 8A-8D show cross-section views of first material 828 and second material 830 forming wearable band 810 (see, FIG. 8E). Distinct from the non-limiting examples discussed herein that discuss thinned portions that have a uniform thickness, first material 828 and second material 830 include similar thicknesses, but include a tapered portion having a tapered thickness for thinned portions 836, 846. It is understood that similarly numbered and/or named components may function in a substantially similar fashion. Redundant explanation of these components has been omitted for clarity.

As shown in FIG. 8A, and similarly discussed herein, first material 828 includes first thinned portion 836, and second material 830 includes second thinned portion 846. Distinct from the various thinned portions discussed herein with respect to FIGS. 3A-7E, first thinned portion 836 and second thinned portion 846 include a varying or tapered thickness ($T_T$). In general, the thinned portions 836, 846 having a varying or tapered thickness ($T_T$) may also be referred to as tapered portions. In the non-limiting example shown in FIG. 8A, first thinned portion 836 of first material 828 includes a varying or tapered thickness ($T_T$) such that the thickness of the material in first thinned portion 836 is smallest or thinnest at end 838 and thicker at opposite end 838. Additionally, second thinned portion 846 of second material 830 includes a varying or tapered thickness ($T_T$) such that the thickness of the material in second thinned portion 846 is smallest or thinnest at end 848 and thicker at opposite end 848. As shown in FIG. 8A, tapered thickness ($T_T$) for first thinned portion 836 and second thinned portion 846 includes a slope or gradient that is substantially constant and/or does not vary. That is, the amount of material removed at the thinnest thickness of first thinned portion 836 at end 838 is substantially equal to the amount of material that remains at the thickest portion of first thinned portion 836 formed opposite end 838. In a non-limiting example, the varying or tapered thickness ($T_T$) of each of first thinned portion 836 and second thinned portion 846 may have a slope or gradient for the taper that is approximately 45°.

Figure 8B:
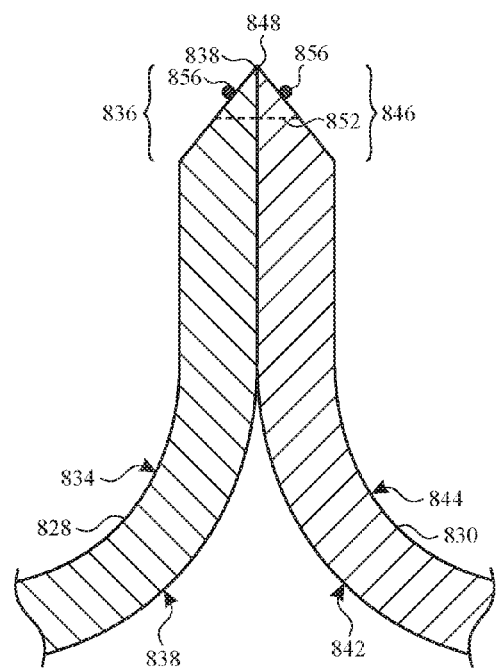
FIG. 8B shows a side cross-section view of the two distinct pieces of material of FIG. 8A sewn together, according to embodiments.

As shown in FIG. 8B, thread 852 is sewn through first thinned portion 836 having a tapered thickness ($T_T$) and second thinned portion 846 also having a tapered thickness ($T_T$). Thread 852 is sewn through first thinned portion 836 and second thinned portion 846 to couple first material 828 to second material 830. Thread 852 being sewn through first thinned portion 836 and second thinned portion 846 may be substantially similar to that described herein with respect to FIGS. 3B and 5B. As such, redundant explanation is omitted.

Figure 8C:
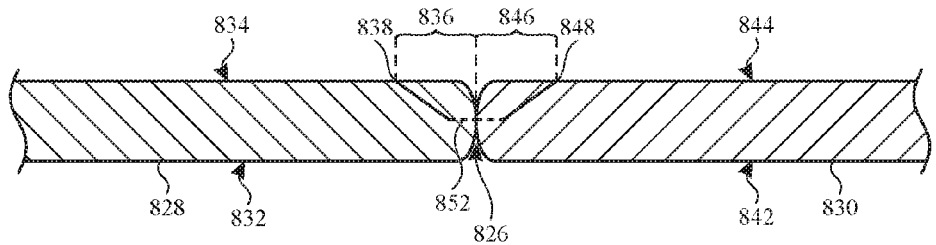
FIG. 8C shows a side cross-section view of the two distinct pieces of material of FIG. 7B with thinned portions folded onto themselves, according to embodiments.

FIG. 8C shows first thinned portion 836 and second thinned portion 846 subsequent to being folded onto themselves. First thinned portion 836 of first material 828 is folded onto itself, such that end 838 is folded toward inner surface 834. Additionally as shown in FIG. 8C, the thinner portion of first thinned portion 836 formed at end 838 is folded onto the thicker portion of first thinned portion 836 formed opposite end 838. As a result of first thinned portion 836 having a constant taper thickness ($T_T$), folded, first thinned portion 836 and end 838 are in planar alignment with inner surface 834 of first material 828.

Additionally, and similar to first thinned portion 836 of first material 828, second thinned portion 846 of second material 830 is folded onto itself, such that end 848 is folded toward inner surface 844. The thinner portion of second thinned portion 846 formed at end 848 is folded onto the thicker portion of second thinned portion 846 formed opposite end 848. Also, as a result of second thinned portion 836 having a constant taper thickness ($T_T$), folded, second thinned portion 846 and end 848 are in planar alignment with inner surface 844 of second material 830.

Figure 8D:
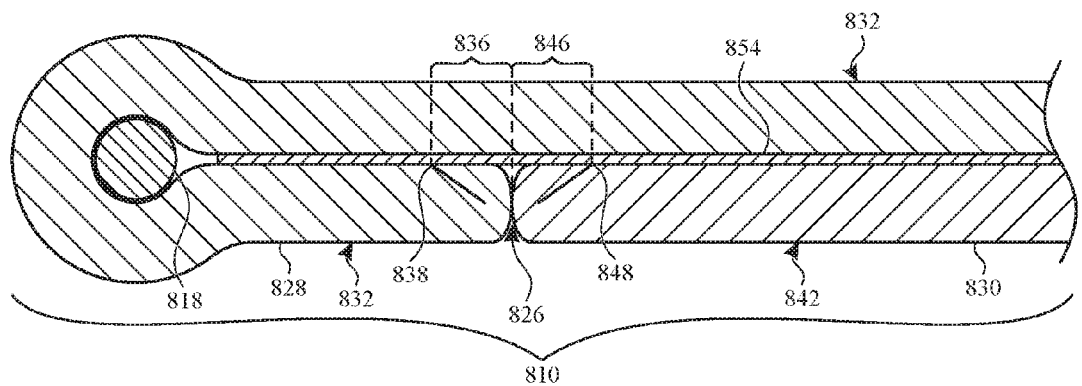
FIG. 8D shows a side cross-section view of the two distinct pieces of material of FIG. 8C forming the wearable band for a wearable electronic device, according to embodiments.

FIG. 8D shows wearable band 810 formed from first material 828 and second material 830 in an operational or final state. As shown in FIG. 8E, first material 828 and second material 830 forming wearable band 810 undergo similar processes as discussed herein with respect to FIG. 3E. That is, filler material 854 may be positioned over first thinned portion 836 having tapered thickness ($T_T$), and second material 830 including second thinned portion 846 having a tapered thickness ($T_T$). First material 830 is also folded over and/or around attachment component 818 and over filler material 854 to form wearable band 810.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable band comprising:
   a first material having a first thinned portion formed on a first surface at a first end of the first material;
   a second material having a second thinned portion formed at a second surface at a second end of the second material; and
   a coupling component coupling the first end to the second end; wherein
   the first thinned portion of the first material is folded onto itself; and
   the second thinned portion of the second material is folded onto itself.

2. The wearable band of claim 1, wherein:
   the first material forms a top layer of the wearable band;
   the second material forms at least a portion of a bottom layer of the wearable band; and
   the coupling component comprises a thread sewn through the first thinned portion and the second thinned portion to form a seam; and
   the seam is positioned along the bottom layer of the wearable band.

3. The wearable band of claim 1, wherein:
   the first thinned portion of the first material is folded about the coupling component and toward the first surface; and
   the second thinned portion of the second material is folded about the coupling component and toward the second surface of the second material.

4. The wearable band of claim 1, wherein the first thinned portion of the first material has first thickness that is less than a second thickness of a remaining portion of the first material adjacent to the first thinned portion.

5. The wearable band of claim 1, wherein the first thinned portion of the first material has first thickness that is approximately half of a second thickness of a remaining portion of the first material adjacent to the first thinned portion.

6. The wearable band of claim 1, further comprising a filler material positioned over the second surface and the second thinned portion of the second material.

7. The wearable band of claim 6, wherein the filler material is positioned over the first thinned portion of the first material.

8. A method for forming a wearable band for an electronic device, comprising:
   thinning a first end of a first band portion to form a first thinned portion;
   thinning a second end of a second band portion to form a second thinned portion;
   positioning the first end of the first band portion adjacent to the second end of the second band portion;
   affixing the first thinned portion of the first band portion to the second thinned portion of the second band portion using a coupling component;
   folding the first thinned portion of the first band portion about the coupling component and onto itself; and folding the second thinned portion about the coupling component and onto itself.

9. The method of claim 8, wherein:
a seam is formed between the first and second band portions; and
the first and second band portions form a smooth substantially flat surface.

10. The method of claim 9, wherein:
the first band portion and the second band portion are part of a continuous strip of material; and
the first and second band portions are joined to form a loop.

11. The method of claim 10, wherein:
the loop is flattened to form a portion of the wearable band; and
the seam is positioned along a bottom surface of the wearable band.

12. The method of claim 10, wherein:
the loop is flattened to form the wearable band; and
the seam is positioned at an attachment end of the wearable band that is configured to couple the wearable band to a device housing.

13. The method of claim 8, further comprising:
folding a remaining portion of the first band portion over the second band portion to form a top layer of the wearable band, wherein:
the second band portion forms at least a portion of a bottom layer of the wearable band.

14. The method of claim 13, further comprising:
positioning a filler material between the bottom layer and the top layer of the wearable band.

15. The method of claim 8, wherein:
positioning the first end of the first band portion adjacent the second end of the second band portion comprises aligning the first end of the first band portion with the second end of the second band portion and releasably coupling the first band portion to the second band portion; and affixing the first thinned portion of the first band portion to the second thinned portion of the second band portion comprises sewing a thread through the first thinned portion and the second thinned portion.

16. A wearable electronic device comprising:
a housing;
a display positioned within the housing; and
a wearable band coupled to the housing and comprising:
a first material forming a top layer of the wearable band, the first material having a thinned portion formed at a first end;
a second material positioned adjacent the first material and forming at least a portion of a bottom layer of the wearable band and having a second thinned portion at a second end of the second material;
a coupling component formed through the thinned portion of the first material and the thinned portion of the second material to couple the first material to the second material, wherein the first and second thinned portions are folded to form a seam.

17. The wearable electronic device of claim 16, wherein:
the first thinned portion of the first material is folded onto itself; and
the first thinned portion of the first material folded onto itself has a thickness that is approximately equal to a remaining portion of the first material.

18. The wearable electronic device of claim 16, wherein a thickness of the wearable band across the seam is substantially uniform.

19. The wearable electronic device of claim 16, wherein the first and second thinned portions have a uniform material thickness.

20. The wearable electronic device of claim 16, wherein:
the first thinned portion of the first material includes a first tapered portion; and
the second thinned portion of the second material includes a second tapered portion.

* * * * *